US 8,824,437 B2

(12) United States Patent
Kubota

(10) Patent No.: US 8,824,437 B2
(45) Date of Patent: Sep. 2, 2014

(54) WIRELESS COMMUNICATIONS DEVICE, ELECTRONIC APPARATUS, AND METHODS FOR DETERMINING AND UPDATING ACCESS POINT

(75) Inventor: Syuji Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 96 days.

(21) Appl. No.: 13/409,672

(22) Filed: Mar. 1, 2012

(65) Prior Publication Data

US 2012/0224569 A1    Sep. 6, 2012

(30) Foreign Application Priority Data

Mar. 2, 2011 (JP) .................................. 2011-045603
Mar. 3, 2011 (JP) .................................. 2011-046824
Mar. 4, 2011 (JP) .................................. 2011-048139

(51) Int. Cl.
*H04W 84/02* (2009.01)

(52) U.S. Cl.
USPC ......................................................... 370/338

(58) Field of Classification Search
CPC ..... H04W 84/12; H04W 84/18; H04W 80/04; H04W 8/26; H04W 88/06
USPC ................................... 370/338, 328; 455/450
See application file for complete search history.

(56) References Cited

U.S. PATENT DOCUMENTS

| | | | | |
|---|---|---|---|---|
| 5,548,649 | A * | 8/1996 | Jacobson ........................ | 713/153 |
| 6,748,233 | B1 * | 6/2004 | Arnold et al. .................. | 455/522 |
| 7,114,024 | B2 * | 9/2006 | Herbst ........................... | 711/100 |
| 7,116,645 | B2 * | 10/2006 | Morvan et al. ................. | 370/278 |
| 7,203,308 | B2 * | 4/2007 | Kubota .......................... | 379/406.05 |
| 7,293,110 | B2 * | 11/2007 | Dowling ......................... | 709/249 |
| 7,359,674 | B2 * | 4/2008 | Markki et al. .................. | 455/41.2 |
| 7,720,038 | B2 * | 5/2010 | Bennett .......................... | 370/338 |
| 7,730,191 | B2 * | 6/2010 | Otsuka et al. .................. | 709/227 |
| 7,864,742 | B2 * | 1/2011 | Bennett .......................... | 370/338 |
| 7,911,991 | B2 * | 3/2011 | Park et al. ...................... | 370/318 |

(Continued)

FOREIGN PATENT DOCUMENTS

| | | | |
|---|---|---|---|
| EP | 2001152 A2 * | 12/2008 | ............... H04L 1/16 |
| JP | 2004-229237 | 8/2004 | |
| JP | 2007-81730 | 3/2007 | |

OTHER PUBLICATIONS

IEEE Std 802.11n Amendment 5: Enhancements for Higher Throughput, 2009.*

(Continued)

*Primary Examiner* — Mark Rinehart
*Assistant Examiner* — Peter Solinsky
(74) *Attorney, Agent, or Firm* — Cooper & Dunham LLP

(57) ABSTRACT

A wireless communications device includes an intent value storage configured to store therein an intent value indicating a level of intention to serve as an access point specified based on a certain criterion; a power supply status information storage configured to store therein a piece of power supply status information indicating whether power is supplied to the wireless communications device from an alternating-current power supply; and an access point determination unit configured to determine, between the wireless communications device and another wireless communications device forming the wireless network, one of the wireless communications devices as the access point. The determination unit is configured to acquire the intent value and the piece of power supply status information of the another wireless communications device, and determine the access point based on both of the intent values and both of the pieces of power supply status information.

7 Claims, 13 Drawing Sheets

(56) References Cited

U.S. PATENT DOCUMENTS

| | | | |
|---|---|---|---|
| 7,924,783 B1* | 4/2011 | Mahany et al. | 370/330 |
| 7,936,757 B2* | 5/2011 | Zhang et al. | 370/392 |
| 8,019,918 B2* | 9/2011 | Otsuka et al. | 710/36 |
| 8,064,483 B2* | 11/2011 | Ooshima | 370/474 |
| 8,121,069 B2* | 2/2012 | Lewis et al. | 370/328 |
| 8,165,142 B2* | 4/2012 | Karaoguz et al. | 370/401 |
| 8,170,546 B2* | 5/2012 | Bennett | 455/424 |
| 8,224,369 B2* | 7/2012 | Ohwatari et al. | 455/522 |
| 8,290,429 B2* | 10/2012 | Imaeda | 455/7 |
| 8,306,541 B2* | 11/2012 | Laroia et al. | 455/450 |
| 8,310,347 B2* | 11/2012 | Keller | 340/10.52 |
| 8,331,251 B2* | 12/2012 | Suzuki et al. | 370/252 |
| 8,406,248 B2* | 3/2013 | Pratt et al. | 370/444 |
| 8,493,931 B1* | 7/2013 | Nix | 370/331 |
| 2003/0110344 A1* | 6/2003 | Szczepanek et al. | 711/100 |
| 2004/0114567 A1* | 6/2004 | Kubler et al. | 370/349 |
| 2004/0145775 A1* | 7/2004 | Kubler et al. | 358/1.15 |
| 2006/0187834 A1* | 8/2006 | Nichols et al. | 370/230 |
| 2006/0242313 A1* | 10/2006 | Le et al. | 709/230 |
| 2008/0056201 A1* | 3/2008 | Bennett | 370/334 |
| 2008/0126420 A1* | 5/2008 | Wright et al. | 707/104.1 |
| 2008/0186990 A1* | 8/2008 | Abali et al. | 370/419 |
| 2008/0304491 A1* | 12/2008 | Scott et al. | 370/396 |
| 2009/0138547 A1* | 5/2009 | Boudreau | 709/203 |
| 2010/0014542 A1* | 1/2010 | Ooshima | 370/474 |
| 2010/0097931 A1* | 4/2010 | Mustafa | 370/235 |
| 2010/0272182 A1* | 10/2010 | Watanabe | 375/240.16 |
| 2010/0284476 A1* | 11/2010 | Potkonjak | 375/260 |
| 2010/0287331 A1* | 11/2010 | Kuo | 711/103 |
| 2011/0085442 A1* | 4/2011 | Lin et al. | 370/235 |
| 2011/0085584 A1* | 4/2011 | Wei et al. | 375/211 |
| 2011/0093536 A1* | 4/2011 | Wentink | 709/204 |
| 2011/0099631 A1* | 4/2011 | Willebeek-LeMair et al. | 726/23 |
| 2011/0219208 A1* | 9/2011 | Asaad et al. | 712/12 |
| 2011/0225305 A1* | 9/2011 | Vedantham et al. | 709/227 |
| 2011/0275328 A1* | 11/2011 | Kwon et al. | 455/67.11 |
| 2011/0280138 A1* | 11/2011 | Terry | 370/252 |
| 2011/0294474 A1* | 12/2011 | Barany et al. | 455/414.1 |
| 2012/0063443 A1* | 3/2012 | Park et al. | 370/345 |
| 2012/0076143 A1* | 3/2012 | Liu | 370/390 |
| 2012/0108282 A1* | 5/2012 | Li et al. | 455/509 |
| 2012/0117354 A1* | 5/2012 | Tatsumura et al. | 711/200 |
| 2012/0170592 A1* | 7/2012 | Dudkowski et al. | 370/419 |
| 2012/0197847 A1* | 8/2012 | Yang et al. | 707/679 |
| 2012/0210325 A1* | 8/2012 | de Lind van Wijngaarden et al. | 718/103 |
| 2012/0224569 A1* | 9/2012 | Kubota | 370/338 |
| 2012/0238287 A1* | 9/2012 | Scherzer | 455/456.1 |
| 2012/0257628 A1* | 10/2012 | Bu et al. | 370/392 |
| 2012/0269186 A1* | 10/2012 | Kubler et al. | 370/352 |
| 2013/0021959 A1* | 1/2013 | Bennet | 370/311 |
| 2013/0083722 A1* | 4/2013 | Bhargava et al. | 370/315 |
| 2013/0086279 A1* | 4/2013 | Archer et al. | 709/233 |
| 2013/0145436 A1* | 6/2013 | Wiley et al. | 726/4 |
| 2013/0147622 A1* | 6/2013 | LaLonde et al. | 340/539.12 |
| 2013/0152189 A1* | 6/2013 | Lee et al. | 726/13 |
| 2013/0222046 A1* | 8/2013 | Furlan | 327/516 |
| 2013/0227152 A1* | 8/2013 | Lee et al. | 709/227 |
| 2013/0286973 A1* | 10/2013 | Selia et al. | 370/329 |
| 2013/0287024 A1* | 10/2013 | Herberg et al. | 370/392 |
| 2013/0294259 A1* | 11/2013 | Lee et al. | 370/248 |

OTHER PUBLICATIONS

Communication-Aware Mobile Hosts in Ad-hoc Wireless Network, K. Paul, S. Bandyopadhyay, A. Mukherjee, D. Saha, 0-7803-49 12-1/99/$10.00@1999 IEEE.*

Wi-Fi Direct, Hughes Systique White Paper, 2006.*

"Wi-Fi Peer-to-Peer (P2P) Technical Specification," Wi-Fi Alliance Technical Committee P2P Task Group, 2010.

* cited by examiner

WIRELESS COMMUNICATIONS DEVICE, ELECTRONIC APPARATUS, AND METHODS FOR DETERMINING AND UPDATING ACCESS POINT

CROSS-REFERENCE TO RELATED APPLICATIONS

The present application claims priority to and incorporates by reference the entire contents of Japanese Patent Application No. 2011-045603 filed in Japan on Mar. 2, 2011, Japanese Patent Application No. 2011-046824 filed in Japan on Mar. 3, 2011 and Japanese Patent Application No. 2011-048139 filed in Japan on Mar. 4, 2011.

BACKGROUND OF THE INVENTION

1. Field of the Invention

The present invention relates to a wireless communications device having an access point function of a wireless network, an electronic apparatus including the wireless communications device, and methods for determining and updating an access point.

2. Description of the Related Art

Wireless local area network (LAN) technologies have been globally popularized in offices and homes. The wireless LAN technologies are standardized by the 802.11 task group of the Institute of Electrical and Electronic Engineers (IEEE), which sets the standards for wireless LAN, known as 802.11a, 802.11g, and 802.11n.

802.11a specifies communications using the 5-GHz frequency range. 802.11g specifies communications using the 2.4-GHz frequency range. 802.11n relates to a wireless communications technique such as multiple input multiple output (MIMO) by which the frequency range for transmitting and receiving data is expanded by combining a plurality of antennas on a transmission side and a receiving side.

As specified by 802.11a/11g/11n, the communications mode is classified into two modes of an infrastructure mode and an ad-hoc mode.

In the infrastructure mode, wireless communications devices serving as wireless LAN terminals are provided around an access point and data is transmitted between one of the wireless communications devices and the other wireless communications device through the access point. The infrastructure mode is a general communications mode mostly used in offices and homes.

On the other hand, in the ad-hoc mode, data is directly transmitted between the wireless communications devices and no access point is provided. That is, the ad-hoc mode requires no access point. When communications in the ad-hoc mode (hereinafter referred to as ad-hoc communications) is made among a plurality of wireless communications devices, each wireless communications device needs to grasp the states of the whole wireless communications devices included in a network. Therefore, there are many cases in which functions such as a transmission rate control function and authentication function are limitedly used. In addition, setting methods for communications are also cumbersome. As a result, the specifications of 802.11a/11g/11n have been only used as an auxiliary communications method.

Recently, the wireless LAN communications functions have been included in devices serving as compact terminals such as cellular phones, digital cameras, printers, and portable audio equipment in addition to the devices serving as the information communication terminals such as personal computers (PCs). Of course, such devices can perform communications through an access point. However, when data is transmitted only between the devices, e.g., the communications between the digital camera and the printer, it is easier and more convenient to directly perform communications therebetween in an ad-hoc-like manner without the access point than to perform communications through the access point.

For example, the Wi-Fi Alliance, which is a trade association devoted to promoting use of wireless LAN products, has been examining specifications for wireless communications setting methods and connection methods for making direct communications between the communications terminals such that the ad-hoc mode is more easily used.

For example, Wi-Fi Peer-to-Peer (P2P) Technical Specification Version 1.1 describes a basic concept of Wi-Fi Direct. According to the basic concept, in a network including a plurality of wireless communications devices each having a simplified access point function, one of the wireless communications devices practically operates as the simplified access point. The simplified access point that behaves like the typical access point enables connection procedures of a maximum transmission rate and an encryption method to be performed in the same manner as the infrastructure mode even though in the ad-hoc mode.

More specifically, in Wi-Fi P2P Technical Specification Version 1.00, each wireless communications device attending a wireless LAN is defined as a Peer to Peer (P2P) device and the network is defined as a P2P group. In the P2P group, the P2P device that practically uses the simplified access point function is defined as a P2P group owner and the other P2P devices other than the P2P group owner are defined as P2P clients. A procedure to determine the P2P group owner among the P2P group devices is defined as a group owner negotiation.

FIG. 12 is a sequence diagram illustrating a procedure in which wireless communications devices 1000 and 2000 that are the P2P devices perform the group owner negotiation after both devices search for connection partners. The wireless communications devices 1000 and 2000 have the same structure. The following description is made on a case where the wireless communications device 2000 starts the searching operation.

As illustrated in FIG. 12, first, the wireless communications device 2000 transmits a probe request frame (sequence S101). Upon receiving the probe request frame, the wireless communications device 1000 sends a probe response frame back (sequence S102).

Upon receiving the probe response frame, the wireless communications device 2000 recognizes the presence of another wireless communications device at a place at which communications can be made with the wireless communications device 2000, transmits a group owner (GO) negotiation request frame, and starts the group owner negotiation (sequence S103). The GO negotiation request frame includes a P2P information element (P2P IE) and a Wi-Fi protected setup information element (WPS IE). The P2P IE includes various types of information such as a group owner intent value that is a parameter indicating a level of intention to serve as the P2P group owner and a "channel" that indicates channels supported by the device. The group owner intent value can be set to an integer between 0 to 15, inclusive.

Upon receiving the GO negotiation request frame, the wireless communications device 1000 sends the GO negotiation response frame back (sequence S104). The GO negotiation response frame includes the P2P IE including the group owner intent value and the "channel" in the same manner as the GO negotiation request frame.

Upon receiving the GO negotiation response frame, the wireless communications device 2000 determines the P2P group owner by the procedure of the flowchart illustrated in FIG. 13, and notifies the wireless communications device 1000 of the determination result with a GO negotiation confirmation frame (sequence S105). Upon receiving the GO negotiation request frame, the wireless communications device 1000 also determines the P2P group owner by the procedure of the flowchart illustrated in FIG. 13. That is, the wireless communications devices 1000 and 2000 individually determine the P2P group owner by the same procedure. The operation of the wireless communications device 2000 is described below.

As illustrated in FIG. 13, the wireless communications device 2000 determines whether a group owner intent value x1 of the wireless communications device 1000 is equal to the group owner intent value x2 of the own device (step ST101). If it is determined that they are not equal (NO at step ST101), the wireless communications device 2000 determines a magnitude relationship between x1 and x2 (step ST102) and determines the wireless communications device having a larger group owner intent value as the P2P group owner (steps ST102 to ST104). That is, if the group owner intent value x2 of the wireless communications device 2000 is larger (YES at step ST102), the wireless communications device 2000 determines the wireless communications device 2000 as the P2P group owner (step ST103). If the group owner intent value x1 of the wireless communications device 1000 is larger (NO at step ST102), the wireless communications device 2000 determines the wireless communications device 1000 as the P2P group owner (step ST104).

If the group owner intent values of the wireless communications devices 1000 and 2000 are equal to each other (YES at step ST101), the wireless communications device 2000 determines whether they are less than 15 (step ST105). If they are less than 15 (YES at step ST105), the wireless communications device 2000 determines the wireless communications device having a tie break bit value of 1 as the P2P group owner (step ST106).

The tie break bit value is randomly set to 1 or 0 by the wireless communications device that issues the GO negotiation request and transmitted by being included in the GO negotiation request frame. The tie break bit value included in the GO negotiation request frame is toggled and sent back by being included in the GO negotiation response frame.

Specifically, when the group owner intent values of the wireless communications devices 1000 and 2000 are less than 15 and are equal to each other, if the wireless communications device 2000 sets the tie break bit value to 1 and transmits the GO negotiation request frame, the wireless communications device 2000 is determined as the P2P group owner while if the wireless communications device 2000 sets the tie break bit value to 0 and transmits the GO negotiation request frame, the wireless communications device 1000 is determined as the P2P group owner.

If the group owner intent values of the wireless communications devices 1000 and 2000 are 15 (NO at step ST105), the wireless communications device 2000 determines that the determination procedure of the P2P group owner has failed (step ST107).

In this way, the connection method described in the Wi-Fi P2P technical specification Version 1.00 can determine the wireless communications device serving as the simplified access point and the P2P communications can be made between the devices without using the access point terminal.

The P2P group owner performs the functions of the access point. For example, the P2P group owner allocates addresses to wireless communications devices (P2P clients) to be connected, performs synchronization with a beacon signal, and serves as a mediator of data communications between wireless communications devices through the simplified access point. That is, the P2P group owner processes loads heavier than those processed by the P2P clients.

In the wireless communications, power is consumed by radio emission. Thus, the more a signal transmission amount increases the more power consumption increases. Therefore, the P2P device having enough power for maintaining the network should be determined as the P2P group owner. For example, the P2P device to be determined as the P2P group owner preferably receives power from an alternating-current (AC) power supply (outlet).

The access point terminal device performing communications in the infrastructure mode is installed fixedly, and generally receives the power from the AC power supply. Thus, the power for maintaining the wireless network does not need to be taken into consideration for such the access point terminal device. On the other hand, in the ad-hoc communications, all of the devices do not always stably receive the power because the battery-driven devices having compact sizes such as the cellular phones and the digital cameras form the wireless network as described above.

In the group owner negotiation described in the Wi-Fi P2P technical specification Version 1.00, however, the group owner intent value and the tie break bit value of each P2P device are used as the criteria for determining the P2P group owner, but the power supply status is not taken into consideration. As a result, after the P2P group is formed, the network may be disconnected because the insufficient remaining battery charge of the P2P group owner causes the network not to be maintained.

Therefore, there is a need for technology capable of reducing possibility of disconnecting a wireless network due to a power shortage to drive a wireless communications device serving as an access point in the wireless network including a plurality of wireless communications devices each having an access point function of the wireless network.

SUMMARY OF THE INVENTION

It is an object of the present invention to at least partially solve the problems in the conventional technology.

According to an embodiment, there is provided a method for determining an access point among a plurality of wireless communications devices each having an access point function in a wireless network. The method includes exchanging intent values and pieces of power supply status information between two wireless communications devices that form the wireless network, each wireless communications device storing the intent value indicating a level of intention to serve as the access point specified on the basis of a certain criterion and the piece of power supply status information indicating whether power is supplied to the each wireless communications device from an alternating-current power supply; and determining, by each wireless communications device, the access point on the basis of both of the intent values and both of the pieces of power supply status information of the wireless communications devices.

According to another embodiment, there is provided a method that includes a method for updating the access point determined by the method for determining the access point according to the above embodiment. The method for updating the access point includes, by one of the wireless communications devices serving as the access point, notifying the other wireless communications device of change information indicating that the one wireless communications device is switched from a status of being supplied from the AC power supply power to a status of being not supplied from the AC power supply power; exchanging, between the one wireless communications device serving as the access point and the other wireless communications device having received the notification, the intent values and the pieces of power supply status information which are stored in each wireless communications device; and each of the one wireless communications device serving as the access point and the wireless communications device having received the notification, determining the access point on the basis of both of the intent values and both of the pieces of power supply status information of the wireless communications devices.

According to still another embodiment, there is provided a wireless communications device that includes an intent value storage configured to store therein an intent value indicating a level of intention to serve as an access point specified on the basis of a certain criterion; a power supply status information storage configured to store therein a piece of power supply status information indicating whether power is supplied to the wireless communications device from an alternating-current power supply; and an access point determination unit configured to determine, between the wireless communications device and another wireless communications device forming the wireless network, one of the wireless communications devices as the access point. The access point determination unit includes an acquisition unit configured to acquire the intent value and the piece of power supply status information of the another wireless communications device, and a determination unit configured to determine the access point on the basis of both of the intent values and both of the pieces of power supply status information of the wireless communications devices.

According to still another embodiment, there is provided an electronic apparatus comprising the wireless communications device according to the above embodiment.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the invention will be described below.

First Embodiment

Figure 1:
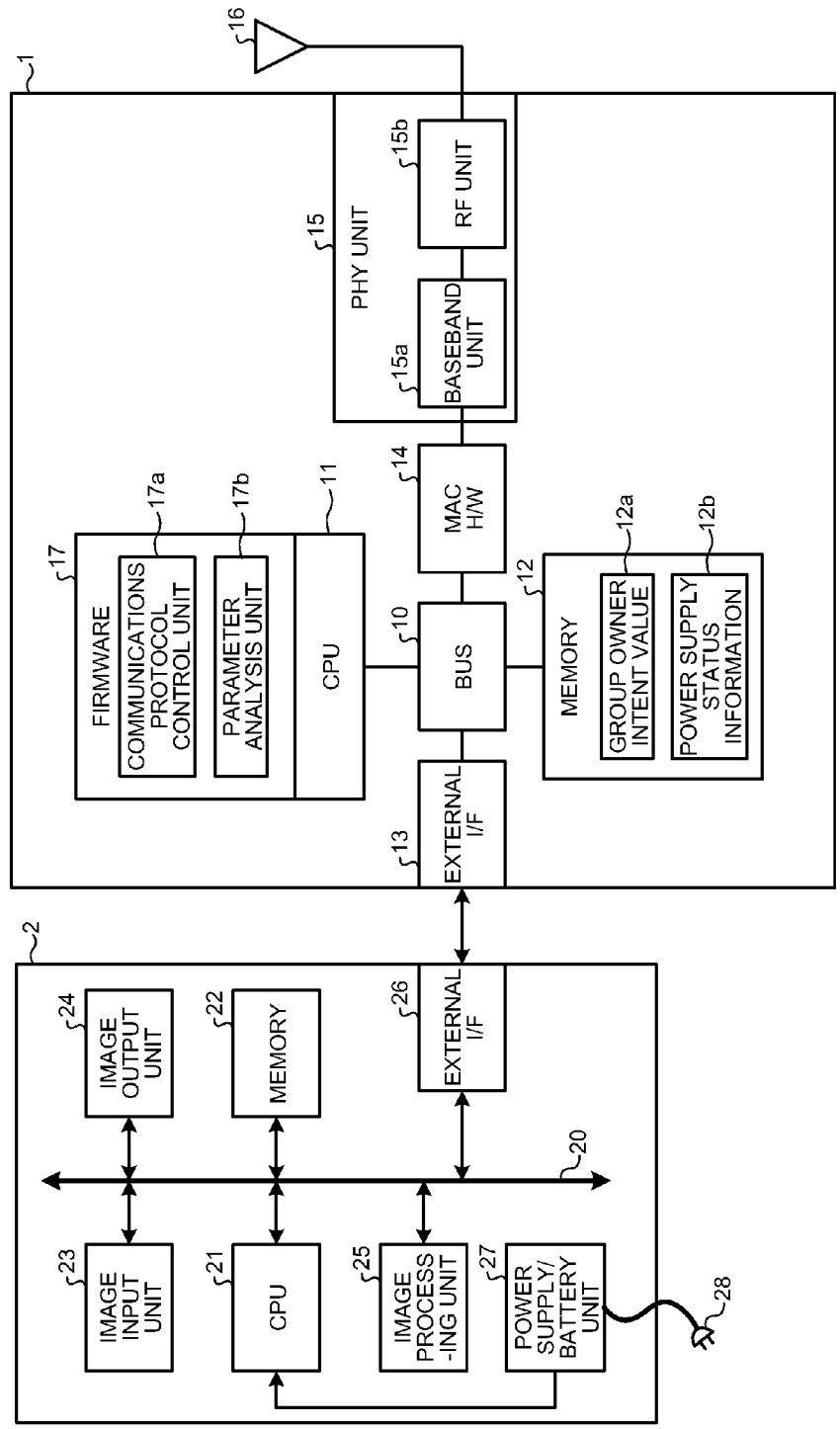
FIG. 1 is a block diagram of an electronic apparatus including a wireless communications device of a first embodiment.

Structure and General Operation of Electronic Apparatus Including Wireless Communications Device FIG. 1 is a block diagram of an electronic apparatus including a wireless communications device 1 of a first embodiment and an image processing device 2. The wireless communications device 1 is compliant with IEEE 802.11 standards.

The wireless communications device 1 includes a bus 10, and a central processing unit (CPU) 11, a memory 12, an external interface (I/F) 13 such as a universal serial bus (USB), and a media access control (MAC) hardware (H/W) 14, all of which are connected to the bus 10. The memory 12 includes a read only memory (ROM) that stores therein firmware 17 executed by the CPU 11 and various types of fixed data, and a random access memory (RAM) that serves as a working area of the CPU 11 when the CPU 11 operates. The wireless communications device 1 further includes a physical layer (PHY) unit 15 that is coupled to the MAC H/W 14, and an antenna 16 coupled to the PHY unit 15. The wireless communications device 1 further includes general components such as a clock generator and a power supply unit, which are omitted to be illustrated and described.

The firmware 17 includes functions necessary for controlling a protocol of a wireless LAN, such as a communications protocol control unit 17a that generates a transmission data frame on the basis of data received from the external I/F 13 and a parameter analysis unit 17b that analyzes the received information. The image processing device 2 may include a part of the functions.

The PHY unit 15 includes a baseband unit 15a and a radio frequency (RF) unit 15b. The baseband unit 15a modulates data from the MAC H/W 14 in a transmission operation while the baseband unit 15a demodulates data from the RF unit 15b in a receiving operation. The RF unit 15b converts a baseband signal from the baseband unit 15a into a wireless frequency signal and sends the wireless frequency signal to the antenna 16 in the transmission operation while the RF unit 15b converts a wireless frequency signal from the antenna 16 into a baseband signal and sends the baseband signal to the baseband unit 15a in the receiving operation.

The image processing device 2 includes a bus 20, and a CPU 21, a memory 22, an image input unit 23, an image output unit 24, an image processing unit 25, and an external I/F 26 such as a USB, all of which are connected to the bus 20. The image processing device 2 is provided with a power supply plug 28, from which the image processing device 2 receives alternating-current (AC) power when the power supply plug 28 is inserted into an AC power supply outlet (not illustrated), and includes a power supply/battery unit 27 that charges a built-in battery.

The CPU 21 controls the whole of the image processing device 2. The memory 22 includes a ROM that stores therein firmware executed by the CPU 21 and various types of fixed data and a RAM that serves as a working area of the CPU 21 when the CPU 21 operates.

The image input unit 23 reads an image of an original and converts the image into image data. The image output unit 24 prints the image on the basis of the image data. The image processing unit 25 performs predetermined image processing on the image data produced by the image input unit 23. The external I/F 26 exchanges data with the external I/F 13 of the wireless communications device 1.

The power supply/battery unit 27 converts the AC power into direct-current (DC) power when the AC power is supplied and supplies the DC power to each unit of the device while the power supply/battery unit 27 supplies the DC power of the battery to each unit of the device when no AC power is supplied. The DC power can be supplied to the wireless communications device 1 from the image processing device 2 by USB bus power.

The power supply/battery unit 27 notifies the CPU 21 of power supply status information that indicates whether the AC power is supplied. The CPU 21 writes the power supply status information in the RAM of the memory 22. The power supply status information is ON when the AC power is supplied while the power supply status information is OFF when no AC power is supplied.

When the wireless communications device 1 sends data to another wireless communications device on the other parties' side in communications, the firmware 17 produces a data frame on the basis of image data received from the external I/F 13 and passes the data frame to the MAC H/W 14. The MAC H/W 14 performs MAC layer processing such as addition of a wireless communications header on the received data frame and passes the resulting data frame to the PHY unit 15. In the PHY unit 15, the baseband unit 15a modulates the received digital data of 0's and 1's and the RF unit 15b converts the modulated data into a wireless frequency signal, which is then sent through the antenna 16.

When the wireless communications device 1 receives data from another wireless communications device on the other parties' side in communications, the antenna 16 receives a wireless frequency signal. The wireless frequency signal is converted into a baseband signal by the RF unit 15b. The baseband signal is converted into digital data of 1's and 0's by the baseband unit 15a. The digital data is passed to the MAC H/W 14. Then the data frame is analyzed by the firmware 17, and sent to the image processing device 2 through the external I/F 13.

Group Owner Negotiation

The firmware 17 includes computer programs and data necessary for performing a group owner negotiation compliant with Wi-Fi Direct in the same manner as conventional devices.

Figure 2:
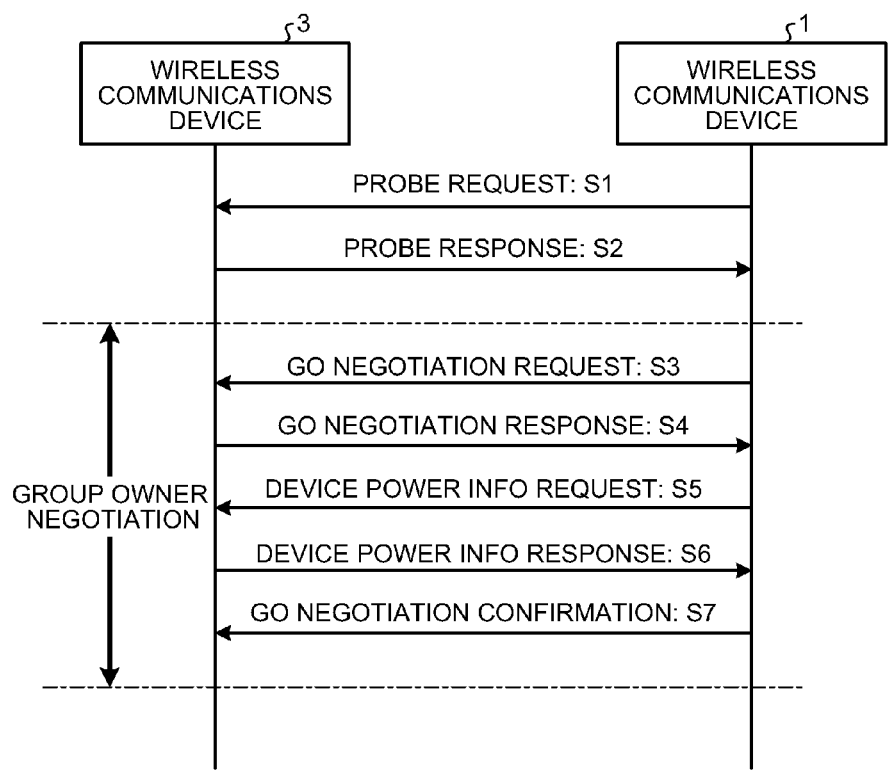
FIG. 2 is a sequence diagram illustrating a group owner negotiation of the wireless communications device of the first embodiment.

FIG. 2 is a sequence diagram illustrating a procedure to determine a Peer to Peer (P2P) group owner between the wireless communications device 1 of the embodiment and a wireless communications device 3 having the same structure as the wireless communications device 1. A case is described below in which the wireless communications device 1 starts searching operation. The wireless communications device 1 preliminarily inputs various types of control information such as a group owner intent value 12a and power supply status information 12b of the image processing device 2 into the memory 12 through the external I/F 13, for example, and stores them therein. The wireless communications device 3 also inputs and stores the various types of control information in the same manner as the wireless communications device 1.

First, the wireless communications device 1 transmits a probe request frame (sequence S1). Upon receiving the probe request frame, the wireless communications device 3 sends a probe response frame back (sequence S2). Upon receiving the probe response frame, the wireless communications device 1 recognizes the presence of another wireless communications device at a place at which communications can be made with the wireless communications device 1, transmits a group owner (GO) negotiation request frame, and starts the group owner negotiation (sequence S3). Upon receiving the GO negotiation request frame, the wireless communications device 3 sends a GO negotiation response frame back (sequence S4).

Then, the wireless communications device 1 transmits a device power information request frame (sequence S5). This frame requests the wireless communications device 3 to transmit the power supply status information 12b and notifies the wireless communications device 3 of the power supply status information 12b of the wireless communications device 1. Upon receiving the device power information request frame, the wireless communications device 3 transmits a device power information response frame including the power supply status information 12b (sequence S6).

Figure 3:
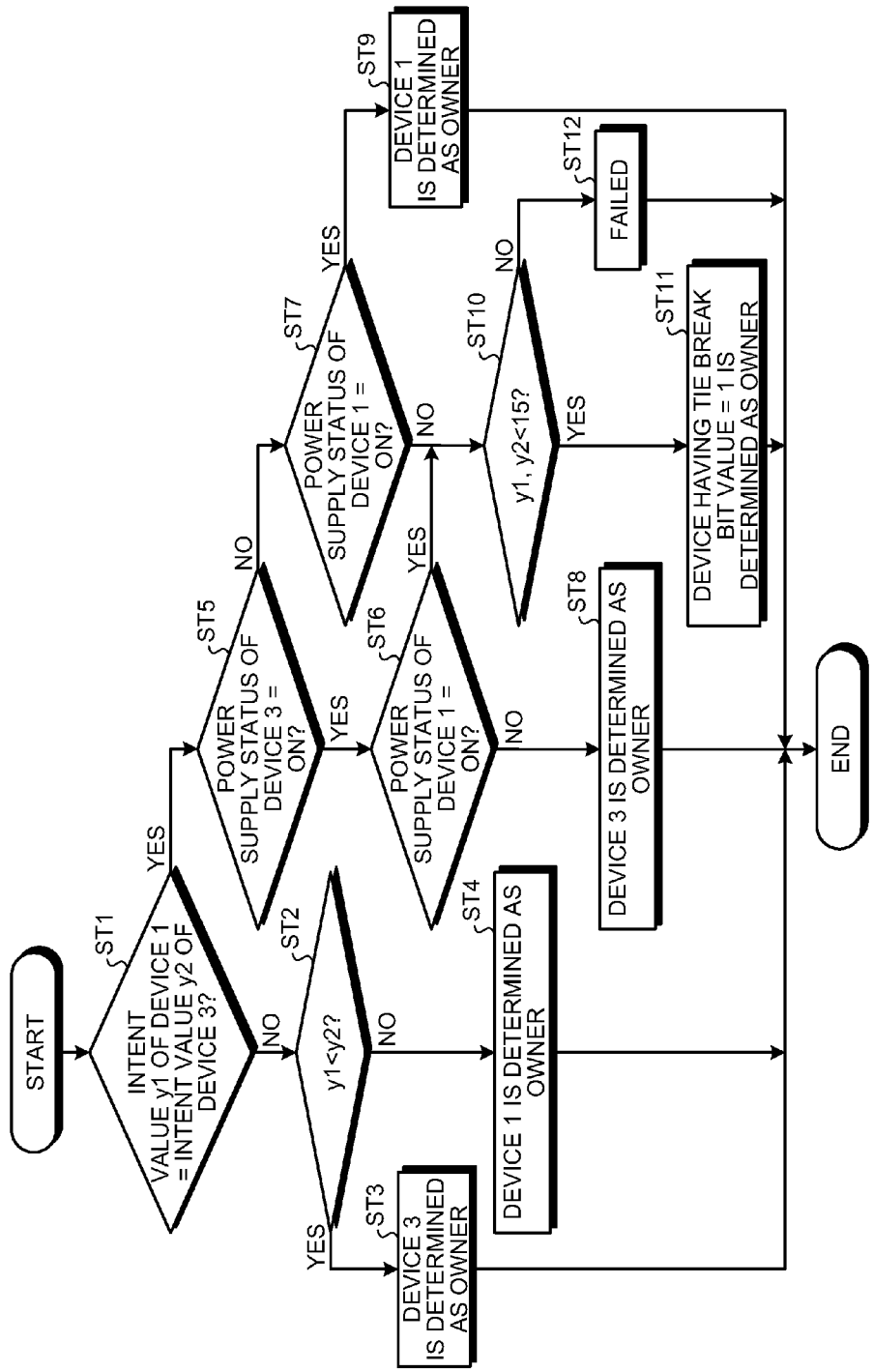
FIG. 3 is a flowchart illustrating a procedure to determine a group owner in the group owner negotiation illustrated in FIG. 2.

Upon receiving the device power information response frame, the wireless communications device 1 determines the P2P group owner by the procedure of the flowchart illustrated in FIG. 3, and notifies the wireless communications device 3 of the result by a GO negotiation confirmation frame (sequence S7). The wireless communications device 3 also determines the P2P group owner by the procedure of the flowchart illustrated in FIG. 3. The operation of the wireless communications device 1 is described below.

As illustrated in FIG. 3, the wireless communications device 1 determines whether a group owner intent value y1 of the own device (the wireless communications device 1) is equal to a group owner intent value y2 of the wireless communications device 3 (step ST1). If it is determined that they are not equal (NO at step ST1), the wireless communications device 1 determines a magnitude relationship between y1 and y2 (step ST2) and determines the wireless communications device having a larger group owner intent value as the P2P group owner (steps ST2 to ST4). That is, if the group owner intent value y1 of the own device is larger (NO at step ST2), the wireless communications device 1 determines the own device as the P2P group owner (step ST4). If the group owner intent value y2 of the wireless communications device 3 is larger (YES at step ST2), the wireless communications device 1 determines the wireless communications device 3 as the P2P group owner (step ST3).

If the group owner intent values of the wireless communications devices 1 and 3 are equal to each other (YES at step ST1), the wireless communications device 1 compares the power supply statuses of both devices with each other. If one of the power supply statuses is ON while the other power supply status is OFF, the wireless communications device 1 determines the device the power supply status of which is ON as the P2P group owner (steps ST5 to ST9). That is, if the power supply status of the wireless communications device 3 is ON (YES at step ST5) and the power supply status of the wireless communications device 1 is OFF (NO at step ST6), the wireless communications device 1 determines the wireless communications device 3 as the P2P group owner (step ST8) while if the power supply status of the wireless communications device 3 is OFF (NO at step ST5) and the power supply status of the wireless communications device 1 is ON (YES at step ST6), the wireless communications device 1 determine the own device as the P2P group owner (step ST9).

If the power supply statuses of both devices are the same each other, i.e., both power supply statuses are ON statuses (YES at step ST5 and YES at step ST6), or both power supply statuses are OFF statuses (NO at step ST5 and NO at step ST7), the wireless communications device 1 determines whether the group owner intent values of both devices are less than 15 (step ST10). If they are less than 15 (YES at ST10), the wireless communications device 1 determines the wireless communications device that has set a tie break bit value to 1 as the P2P group owner (step ST11) while if they are 15 (NO at step ST10), the wireless communications device 1 determines that the determination procedure of the P2P group owner has failed (step ST12).

Figure 13:
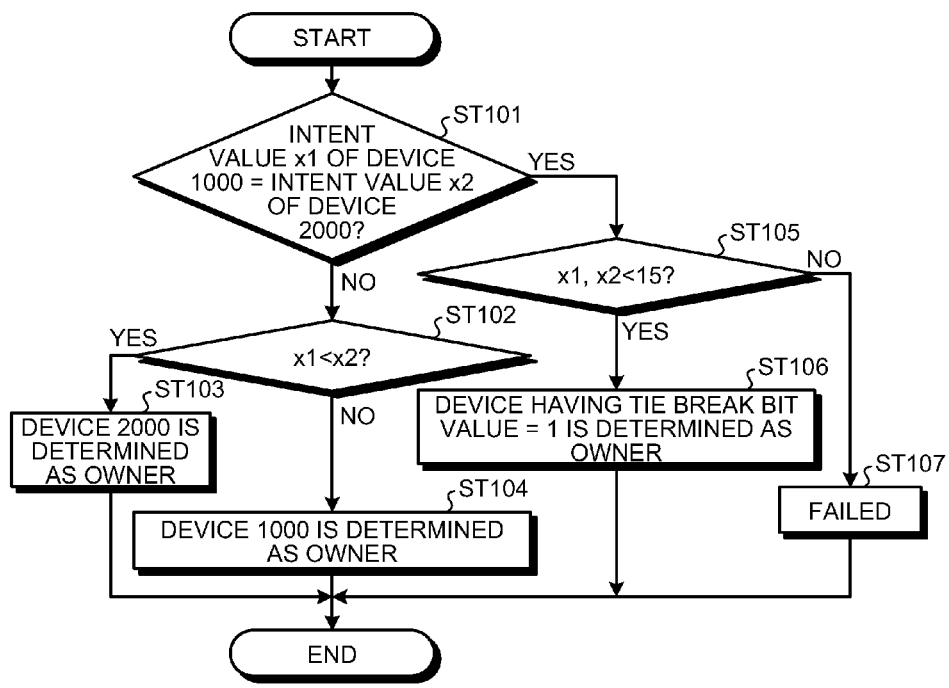
FIG. 13 is a flowchart illustrating a procedure to determine the group owner in the group owner negotiation illustrated in FIG. 12.

The contents of steps ST1 to ST4 and steps ST10 to ST12 in FIG. 3 are the same as those of steps ST101 to ST104 and steps ST105 to ST107 in FIG. 13. That is, the processing of the flowchart of FIG. 3 is equivalent to the processing structured by adding steps ST5 to ST9 between YES at step ST101 and step ST105 of the conventional processing illustrated in FIG. 13.

In this way, when determining the P2P group owner between the wireless communications devices 1 and 3, the wireless communications device 1 of the embodiment compares the power supply statuses of both devices 1 and 3 if the group owner intent values of both devices 1 and 3 are equal to each other and determines the device to which AC power is supplied as the P2P group owner. That is, the device to which AC power is supplied can be determined as the P2P group owner even if the group owner intent values of both devices are equal to each other. As a result, the device determined as the P2P group owner can receive stable power supply and maintain the wireless network.

If the wireless communications devices 1 and 3 operate normally, the P2P group owner determined by each of the wireless communications devices 1 and 3 will be the same. Therefore, if the P2P group owner determined by the wireless communications device 3 is not the same as the P2P group owner notified from the wireless communications device 1 with the GO negotiation confirmation frame, the wireless communications device 3 can adopt the P2P group owner notified from the wireless communications device 1 or transmit an error notification to the wireless communications device 1.

In FIG. 1, the power supply status information is transmitted from the image processing device 2 to the wireless communications device 1 through the external I/F 26 and the external I/F 13. However, the power supply status information 12b can be input to an external port of the CPU 11 of the wireless communications device 1 from the power supply/battery unit 27. In addition, the image processing device 2 can include the wireless communications device 1.

In the procedure illustrated in FIG. 2, the power supply status information is exchanged by transmitting the device power information request frame and the device power information response frame. In other words, the intent value and the power supply status information are sequentially acquired by each wireless communications device. The transmission of the device power information request frame and the device power information response frame can be omitted as follows: the power supply status information 12b of the wireless communications device 1 is included in the GO negotiation request frame while the power supply status information 12b of the wireless communications device 3 is included in the GO negotiation response frame, and the power supply status information 12b is exchanged by transmitting the GO negotiation request frame and the GO negotiation response frame. In other words, the intent value and the power supply status information may be simultaneously acquired by each wireless communications device.

When another wireless communications device newly moves to a position at which communications can be made between the wireless communications devices forming the P2P group, and the wireless communications device intends to serve as the P2P group owner after the P2P group owner has determined by the procedure illustrated in FIG. 2, the group owner negotiation is executed between the wireless communications device and the P2P group owner, and the P2P group owner is newly decided.

According to the first embodiment, in a network group including a plurality of wireless communications devices and ad-hoc network communications, in which one of the wireless communications devices in the network group is selected and plays like an access point role in infrastructure communications as the P2P group owner, the P2P group owner is determined as follows: the wireless communications devices, each of which has the group owner intent value that indicates a level of intention to serve as the owner and the piece of power supply status information 12b that indicates whether power is supplied from the AC power supply, exchange the group owner intent value and the piece of power supply status information 12b each other, compare the exchanged pieces of power supply status information 12b with each other if the exchanged group owner intent values are equal to each other, and determine the wireless communications device to which the AC power is supplied as the P2P group owner. Accordingly, the wireless communications device to which the AC power is supplied can be determined as the P2P group owner even if the exchanged group owner intent values are equal to each other. As a result, the wireless communications device determined as the P2P group owner can receive stable power supply and maintain the network group.

Updating Group Owner

A procedure to update the P2P group owner determined by the procedure illustrated in FIG. 2 is described below with reference to the sequence diagram illustrated in FIG. 4. In the following procedure, the power supply status information is requested and the request is transmitted by being included in the transmission of the GO negotiation request frame and the GO negotiation response frame. In a time axis (the lines extending downward from the wireless communications devices 1 and 3) illustrated in FIG. 4, the rectangular area indicated with diagonals represents a period of time in which the wireless communications device 1 or 3 serves as the P2P group owner.

Figure 4:
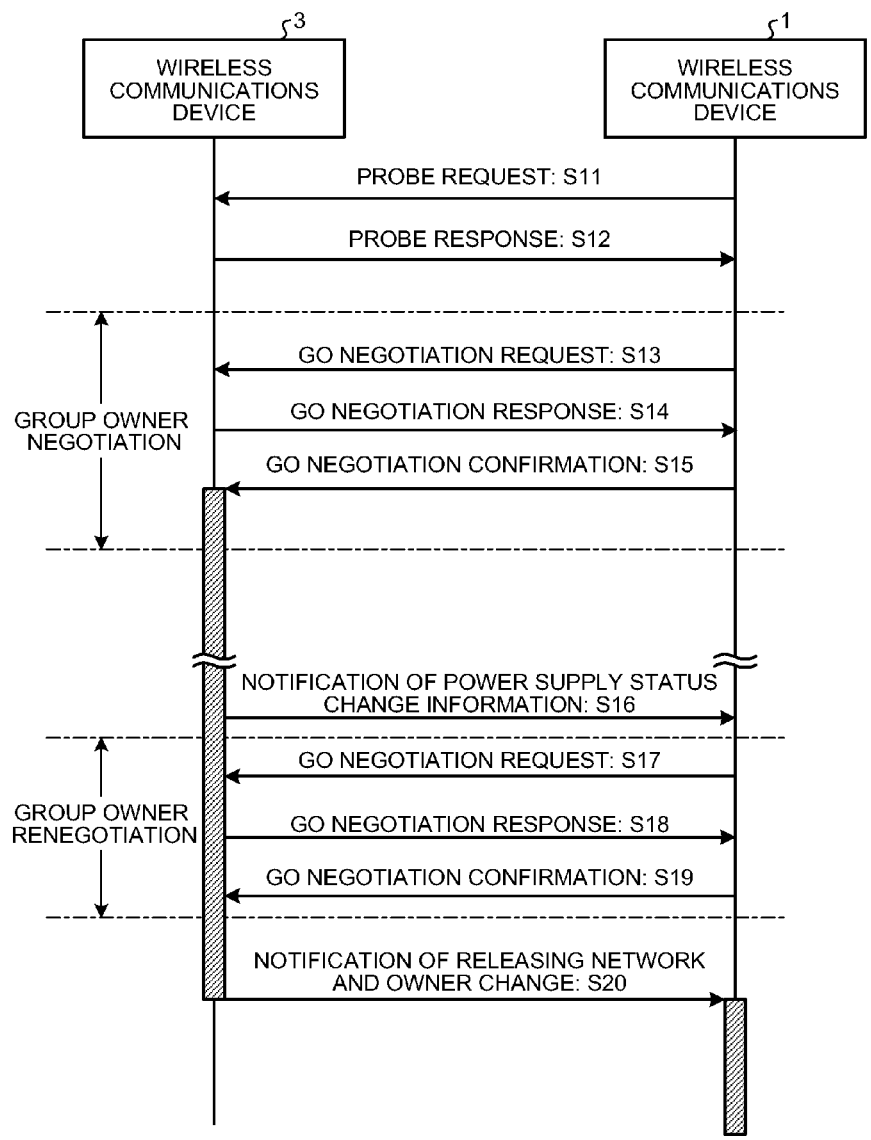
FIG. 4 is a sequence diagram illustrating the group owner negotiation and a group owner renegotiation of the wireless communications device of the first embodiment.

As illustrated in FIG. 4, the wireless communications device 1 transmits the probe request frame and the wireless communications device 3 transmits the probe response frame (sequences S11 and S12) and then the group owner negotiation is performed so as to decide the P2P group owner (sequences S13 to S15). In this case, the wireless communications device 3 is determined as the P2P group owner. The P2P group includes another P2P client (not illustrated) in addition to the wireless communications device 1.

Suppose that the power supply status is changed from ON to OFF when the wireless communications device 3 operates as the P2P group owner. The wireless communications device 3 transmits a frame that is the notification of power supply status change information to the P2P client (in this case, the wireless communications device 1) (sequence S16).

Upon receiving the frame that is the notification of the power supply status change information, the wireless communications device 1 transmits the GO negotiation request frame to the wireless communications device 3 if the wireless communications device 1 intends to serve as the P2P group owner, which is described later in detail (sequence S17). As a result, a group owner renegotiation starts.

The types of information exchanged in sequences S17 to S19 of the group owner renegotiation are the same as those exchanged in sequences S13 to S15 of the group owner negotiation. In this case, the wireless communications device 1 determines that the wireless communications device 1 itself newly serves as the P2P group owner and notifies the wireless communications device 3 of the determination with the GO negotiation confirmation frame (sequence S19).

Upon being notified that the wireless communications device other than itself has been newly determined as the P2P group owner, the wireless communications device 3 notifies the wireless communications device 1 and the other wireless communications device (not illustrated), both of which are currently the P2P clients, of release of the wireless network the P2P group owner of which is the wireless communications device 3 and the change of the owner (sequence S20).

Figure 5:
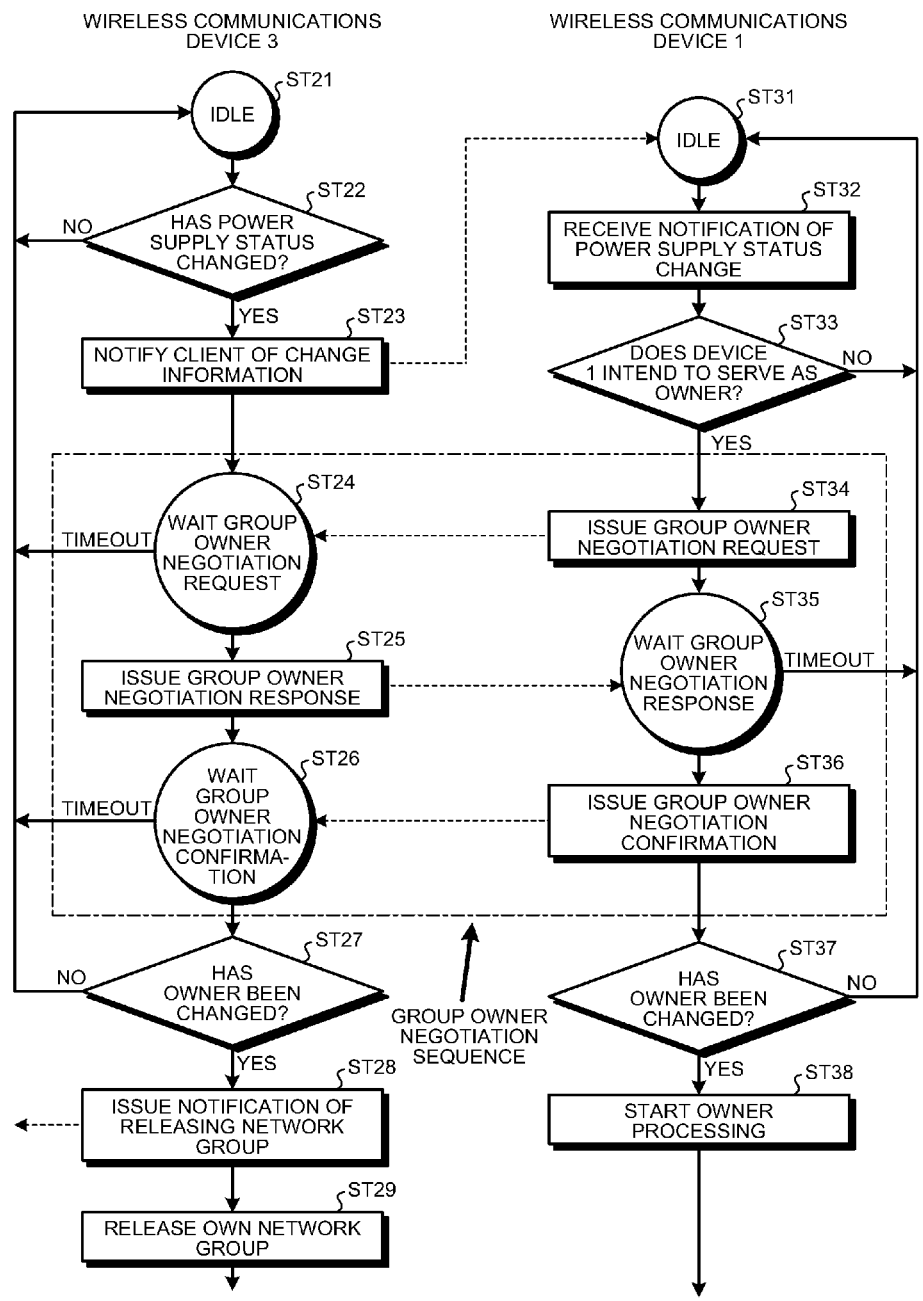
FIG. 5 is a flowchart illustrating operation of the wireless communications devices in the group owner renegotiation illustrated in FIG. 4.

FIG. 5 is a flowchart illustrating the operation of the wireless communications devices 1 and 3 in sequences S16 to S20 illustrated in FIG. 4 and after sequences S16 to S20. In FIG. 5, steps ST21 to ST29 relate to the operation of the wireless communications device 3 while steps ST31 to ST38 relate to the operation of the wireless communications device 1. The P2P client other than the wireless communications device 1 operates in the same manner as the wireless communications device 1. That is, the wireless communications device 3 serving as the P2P group owner sequentially executes the steps of the flow illustrated in FIG. 5 on all of the wireless communications devices serving as the P2P clients.

Once the power supply status is changed from ON to OFF (YES at step ST22) when being in an idling (idle) state (step ST21), the wireless communications device 3 transmits the frame that is the notification of the power supply status change information to the wireless communications device 1 serving as the P2P client (step ST23). This step corresponds to sequence S16 of FIG. 4.

Upon receiving the frame that is the notification of the power supply status change information (step ST32) when being in an idling state (step ST31), the wireless communications device 1 determines the replacement of the P2P group owner, i.e., whether the wireless communications device 1 intends to serve as the P2P group owner (step ST33).

In this case, the wireless communications device 1 determines that the wireless communications device 1 intends to serve as the P2P group owner when the power supply status, which has been OFF in the group owner negotiation by which the wireless communications device 1 has been determined as the P2P client, is changed to ON.

If the wireless communications device 1 intends to serve as the P2P group owner as the replacement (YES at step ST33), the wireless communications device 1 issues a group owner negotiation request and transmits the request to the wireless communications device 3 (step ST34). This step corresponds to sequence S17 of FIG. 4. If the wireless communications device 1 does not intend to serve as the P2P group owner as the replacement (NO at step ST33), the wireless communications device 1 proceeds to the idling state (step ST31).

After transmitting the frame that is the notification of the power supply status change information, the wireless communications device 3 waits a group owner negotiation request frame (step ST24). If the wireless communications device 3 receives the group owner negotiation request frame within a predetermined period of time, the wireless communications device 3 issues a group owner negotiation response and transmits the response to the wireless communications device 1 (step ST25). This step corresponds to sequence S18 of FIG. 4. If the wireless communications device 3 does not receive the group owner negotiation request frame within the predetermined period of time (TIMEOUT at step ST24), the wireless communications device 3 proceeds to the idling state (step ST21).

After transmitting the group owner negotiation request frame, the wireless communications device 1 waits the group owner negotiation response frame (step ST35). If the wireless communications device 1 receives the group owner negotiation response frame within a predetermined period of time, the wireless communications device 1 determines the P2P group owner by the flow illustrated in FIG. 3, and then issues a group owner negotiation confirmation and transmits the confirmation of the group owner negotiation to the wireless communications device 3 (step ST36). This step corresponds to sequence S19 of FIG. 4. If the wireless communications device 1 does not receive the group owner negotiation response frame within the predetermined period of time (TIMEOUT at step ST35), the wireless communications device 1 proceeds to the idling state (step ST31).

After transmitting the group owner negotiation response frame, the wireless communications device 3 waits the group owner negotiation confirmation frame (step ST26). If the wireless communications device 3 receives the group owner negotiation confirmation frame within a predetermined period of time, the wireless communications device 3 determines whether the P2P group owner has been replaced on the basis of information included in the group owner negotiation confirmation frame (step ST27). If the wireless communications device 3 determines that the P2P owner has been replaced (YES at step ST27), the wireless communications device 3 issues a release notification of the network group the P2P group owner of which is the wireless communications device 3 to the P2P clients (step ST28) and releases the network group (step ST29).

If the wireless communications device 3 does not receive the group owner negotiation confirmation frame within the predetermined period of time (TIMEOUT at step ST26) or determines that the P2P group owner has not been replaced (NO at step ST27), the wireless communications device 3 proceeds to the idling state (step ST21).

After transmitting the group owner negotiation confirmation frame, the wireless communications device 1 determines whether the P2P group owner has been replaced, i.e., the wireless communications device 1 has been determined as the P2P group owner (step ST37). If the wireless communications device 1 determines that the P2P group owner has been replaced (YES at step ST37), the wireless communications device 1 starts owner processing (step ST38). If the wireless communications device 1 determines that the P2P group owner has not been replaced (NO at step ST37), the wireless communications device 1 proceeds to the idling state (step ST31).

In this way, the wireless communications device of the first embodiment hands over the P2P group owner to the other wireless communications device when changed from being driven by the AC power to being driven by the battery after structuring a network (network group) with the other wireless communications device and serving as the P2P group owner in the network. As a result, the wireless communications device can continually maintain the network without stopping the network.

The following modifications 1 and 2 can be made in the first embodiment.

Modification 1: when the power supply status is ON at the transmission of the group owner negotiation request frame, the intent value is increased while when the power supply status is OFF at the transmission of the group owner negotiation request frame, the intent value is decreased.

Modification 2: when the negotiation is performed between the wireless communications devices both of which are driven by the batteries, the device having a battery charge higher than that of the other device is determined as the P2P group owner. Remaining battery charge information is periodically exchanged between the wireless communications devices so as to enable the replacement of the P2P group owner on the basis of the information. The intent value is dynamically changed in accordance with the remaining battery charge. When the remaining battery charge of the wireless communications device serving as the group owner is below a predetermined value, the wireless communications device notifies the clients of quitting of the group owner.

Second Embodiment

Figure 6:
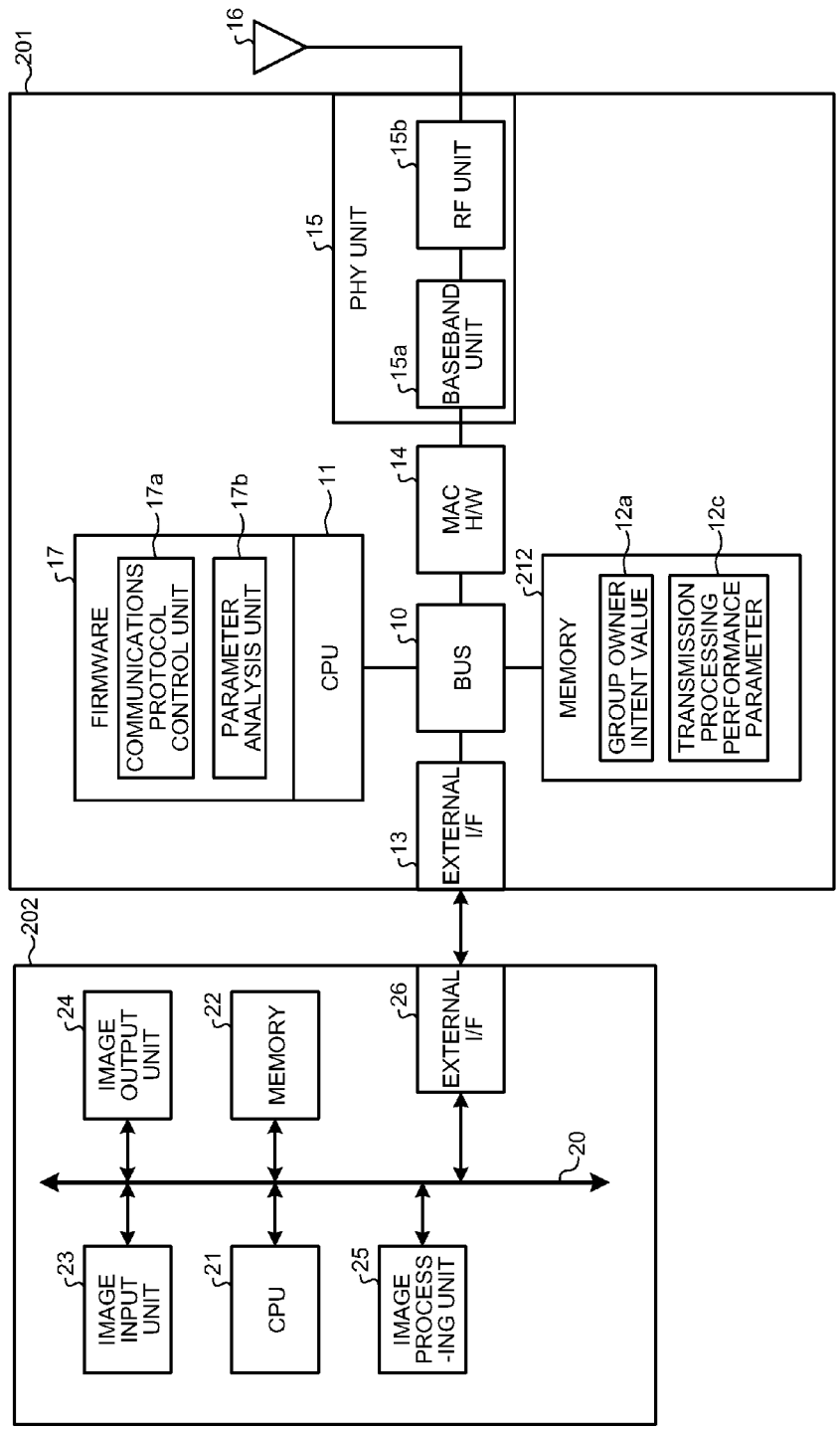
FIG. 6 is a block diagram of an electronic apparatus including a wireless communications device of a second embodiment.

Structure and General Operation of Electronic Apparatus Including Wireless Communications Device FIG. 6 is a block diagram of an electronic apparatus including the wireless communications device 201 of a second embodiment and an image processing device 202. The wireless communications device 201 is compliant with IEEE 802.11 standards. The structure illustrated in FIG. 6 differs from that in FIG. 1 in that a memory 212 includes a transmission processing performance parameter 12c. Except for that, the structure of FIG. 6 is the same as that of FIG. 1. Thus, the same elements are labeled with the same reference numerals and the description thereof is omitted.

Group Owner Negotiation

The firmware 17 includes computer programs and data necessary for performing a group owner negotiation compliant with Wi-Fi Direct in the same manner as conventional devices.

Figure 7:
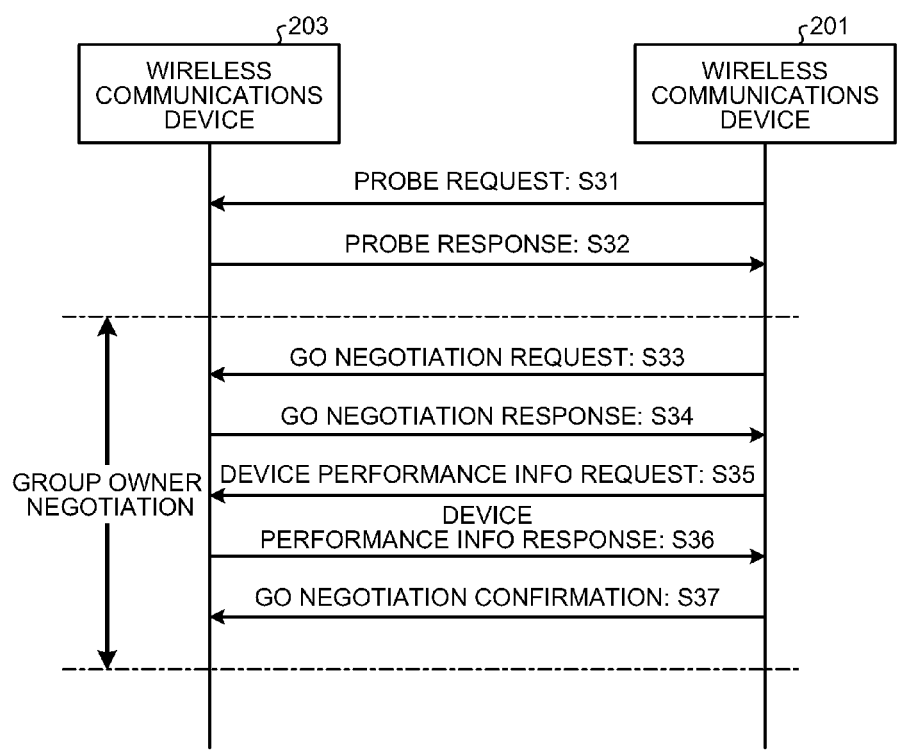
FIG. 7 is a sequence diagram illustrating the group owner negotiation of the wireless communications device of the second embodiment.

FIG. 7 is a sequence diagram illustrating a procedure to determine the P2P group owner between the wireless communications device 201 of the second embodiment and the wireless communications device 203 having the same structure as the wireless communications device 201. A case is described below in which the wireless communications device 201 starts the searching operation. The wireless communications device 201 preliminarily inputs various types of control information such as the group owner intent value 12a and the transmission processing performance parameter 12c into the memory 212 through the external I/F 13, for example, and stores them therein. The wireless communications device 203 also inputs and stores the various types of control information in the same manner as the wireless communications device 201.

The transmission processing performance parameter 12c represents a transmission processing performance of the wireless communications device 201. For example, the transmission processing performance parameter 12c represents a throughput value of a media access control-service access point (MAC-SAP) or a throughput value of a transmission control protocol/Internet protocol (TCP/IP) layer.

The value used as the transmission processing performance parameter 12c is preliminarily determined because the transmission processing performance parameter 12c is compared between the P2P devices in the group owner negotiation in addition to the comparison of the group owner intent values in the second embodiment, which is described later.

For example, when the throughput value of the MAC-SAP is used, the transmission processing performance parameter 12c of the device having a transmission processing performance of 50 Mbps is 50 while the transmission processing performance parameter 12c of the device having a transmission processing performance of 200 Mbps is 200. The transmission processing performance, however, depends on the type of data and a data length. Thus, it is recommended to preliminarily determine a measurement method. For example, a measurement method is determined as follows: a throughput value of a TCP/IP layer is measured, the transfer data size is 1 Mbytes, FTP protocol is used, packet data size is 4096 bytes, cryptographic processing is performed, and no burst transfer is performed.

As illustrated in FIG. 7, first, the wireless communications device 201 transmits the probe request frame (sequence S31). Upon receiving the probe request frame, the wireless communications device 203 sends the probe response frame back (sequence S32). Upon receiving the probe response frame, the wireless communications device 201 recognizes the presence of another wireless communications device at a place at which communications can be made with the wireless communications device 201, transmits the GO negotiation request frame, and starts the group owner negotiation (sequence S33). Upon receiving the GO negotiation request frame, the wireless communications device 203 sends the GO negotiation response frame back (sequence S34).

Then, the wireless communications device 201 transmits a device performance information request frame (sequence S35). This frame requests the wireless communications device 203 to transmit the transmission processing performance parameter 12c and notifies the wireless communications device 203 of the transmission processing performance parameter 12c of the wireless communications device 201. Upon receiving the device performance information request frame, the wireless communications device 203 transmits a device performance information response frame including the transmission processing performance parameter 12c (sequence S36).

Figure 8:
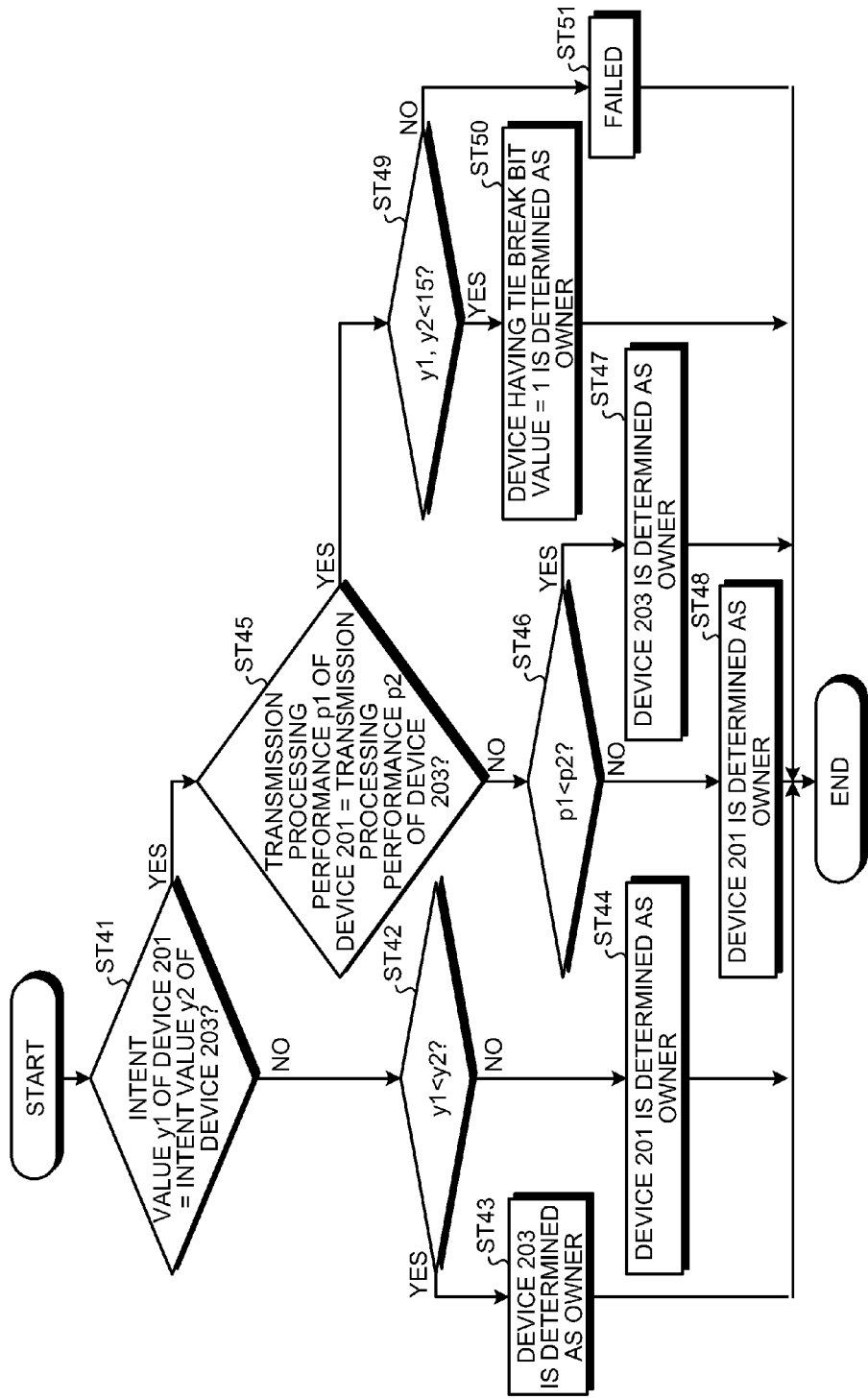
FIG. 8 is a flowchart illustrating a procedure to determine the group owner in the group owner negotiation illustrated in FIG. 7.

Upon receiving the device performance information response frame, the wireless communications device 201 determines the P2P group owner by the procedure of the flowchart illustrated in FIG. 8, and notifies the wireless communications device 203 of the result with the GO negotiation confirmation frame (sequence S37). The wireless communications device 203 also determines the P2P group owner by the procedure of the flowchart illustrated in FIG. 8. The operation of the wireless communications device 201 is described below.

As illustrated in FIG. 8, the wireless communications device 201 determines whether the group owner intent value y1 of the own device (the wireless communications device 201) is equal to the group owner intent value y2 of the wireless communications device 203 (step ST41). If it is determined that they are not equal (NO at step ST41), the wireless communications device 201 determines a magnitude relationship between y1 and y2 (step ST42) and determines the wireless communications device having a larger group owner intent value as the P2P group owner (steps ST42 to ST44). That is, if the group owner intent value y1 of the own device is larger (NO at step ST42), the wireless communications device 201 determines the own device as the P2P group owner (step ST44). If the group owner intent value y2 of the wireless communications device 203 is larger (YES at step ST42), the wireless communications device 201 determines the wireless communications device 203 as the P2P group owner (step ST43).

If the group owner intent values of the wireless communications devices 201 and 203 are equal to each other (YES at step ST41), the wireless communications device 1 determines whether the transmission processing performance parameters 12c of both devices are equal to each other (step ST45). If it is determined that they are not equal to each other (NO at step ST45), the wireless communications device 201 determines the wireless communications device having higher transmission processing performance as the P2P group owner (steps ST46 to ST48). That is, if a transmission processing performance p1 of the own device (the wireless communications device 201) is larger (NO at step ST46), the wireless communications device 201 determines the own device as the P2P group owner (step ST48). If a transmission processing performance p2 of the wireless communications device 203 is larger (YES at step ST46), the wireless communications device 201 determines the wireless communications device 203 as the P2P group owner (step ST47).

If the transmission processing performances of both devices are equal to each other (YES at step ST45), the wireless communications device 201 determines whether the group owner intent values of both devices are less than 15 (step ST49). If they are less than 15 (YES at ST49), the wireless communications device 201 determines the wireless communications device that has set the tie break bit value to 1 as the P2P group owner (step ST50) while if they are 15 (NO at step ST49), the wireless communications device 201 determines that the determination procedure of the P2P group owner has failed (step ST51).

The contents of steps ST41 to ST44 and steps ST49 to ST51 in FIG. 8 are the same as those of steps ST101 to ST104 and steps ST105 to ST107 in FIG. 13. That is, the processing of the flowchart of FIG. 8 is equivalent to the processing structured by adding steps ST45 to ST48 between YES at step ST101 and step ST105 of the processing illustrated in FIG. 13.

In this way, when determining the P2P group owner between the wireless communications devices 201 and 203, the wireless communications device 201 of the second embodiment compares the transmission processing performances of both devices if the group owner intent values of both devices are equal to each other and determines the device having higher transmission processing performance as the P2P group owner. That is, the device having the higher transmission processing performance can be determined as the P2P group owner even if the group owner intent values of both devices are equal to each other. As a result, possibility of dropping the performance of the whole wireless network due to a transmission processing performance shortage of the device serving as the P2P group owner can be reduced.

If the wireless communications devices 201 and 203 operate normally, the P2P group owner determined by each of the wireless communications devices 201 and 203 will be the same. Therefore, if the P2P group owner determined by the wireless communications device 203 is not the same as the P2P group owner notified from the wireless communications device 201 with the GO negotiation confirmation frame, the wireless communications device 203 can adopt the P2P group owner notified from the wireless communications device 201 or transmit an error notification to the wireless communications device 201.

In the procedure illustrated in FIG. 7, the transmission processing performance parameter 12c is exchanged by transmitting the device performance information request frame and the device performance information response frame. The transmission of the device performance information request frame and the device performance information response frame can be omitted as follows: the transmission processing performance parameter 12c of the wireless communications device 201 is included in the GO negotiation request frame while the transmission processing performance parameter 12c of the wireless communications device 203 is included in the GO negotiation response frame, and the transmission processing performance parameter 12c is exchanged by transmitting the GO negotiation request frame and the GO negotiation response frame.

When another wireless communications device newly moves to a position at which communications can be made between the wireless communications devices forming the P2P group and the wireless communications device intends to serve as the P2P group owner after the P2P group owner has determined by the procedure illustrated in FIG. 7, the group owner negotiation is performed between the wireless communications device and the P2P group owner, and the P2P group owner is newly decided.

According to the second embodiment, in a network group including a plurality of wireless communications devices and the ad-hoc network communications, in which one of the wireless communications devices in the network group is selected and plays like an access point role in the infrastructure communications as the P2P group owner, the P2P group owner is determined as follows: the wireless communications devices, each of which has the group owner intent value that indicates a level of intention to serve as the owner and the transmission processing performance parameter 12c that indicates the transmission processing performance, exchange the group owner intent value and the transmission processing performance parameter 12c each other, compare the exchanged transmission processing performance parameters 12c with each other if the exchanged group owner intent values are equal to each other, and decide the wireless communications device having the higher transmission processing performance as the P2P group owner. Accordingly, the wireless communications device having the higher transmission processing performance can be determined as the P2P group owner even if the exchanged group owner intent values are equal to each other. As a result, the possibility of dropping the performance of the whole wireless network due to the transmission processing performance shortage of the device serving as the P2P group owner can be reduced because the wireless communications device having the highest transmission processing performance is determined as the P2P group owner among the wireless communications devices forming the network group.

In the second embodiment, the P2P group owner is determined on the basis of the difference between the transmission processing performances if the group owner intent values of the wireless communications devices 201 and 203 are equal to each other after exchanging of the group owner intent values between both devices in the group owner negotiation. The P2P group owner, however, may be determined by only exchanging and comparing the transmission processing performance parameters 12c without exchanging and comparing the group owner intent values. In this case, the P2P group owner can be determined simply on the basis of the difference between the transmission processing performances without being influenced by the group owner intent values. As a result, the performance drop of the whole wireless network due to the transmission processing performance shortage of the device serving as the P2P group owner can be reliably prevented.

A method according to the second embodiment is for determining an access point among a plurality of wireless communications devices each having an access point function of a wireless network, the method including: exchanging pieces of transmission processing performance information between two wireless communications devices that form the wireless network, each wireless communications device storing the piece of transmission processing performance information; and determining, by each wireless communications device, the access point on the basis of both of the pieces of transmission processing performance information of the wireless communications devices.

The method according to the second embodiment may further include exchanging intent values that each indicate a level of intention to serve as the access point specified on the basis of a certain criterion between the two wireless communications devices, the intent values being stored in the wireless communications devices, respectively, wherein the determining may include determining the access point the basis of both of the intent values and both of the pieces of transmission processing performance information of the wireless communications devices.

In the method according to the second embodiment, the exchanging the pieces of transmission processing performance information and the exchanging the intent values may be simultaneously performed.

In the method according to the second embodiment, the exchanging the pieces of transmission processing performance information and the exchanging the intent values may be sequentially performed.

In the method according to the second embodiment, the determining may include: determining a magnitude relationship between the both of the intent values; determining the wireless communications device having a larger intent value as the access point when it is determined that the intent values are not equal to each other; and determining the wireless communications device having higher transmission processing performance as the access point when it is determined that the intent values are equal to each other.

In the method according to the second embodiment, the exchanging the transmission processing performance information may include: requesting the transmission processing performance information by one of the two wireless communications devices to the other wireless communications device and notifying the other wireless communications device of the transmission processing performance information of the one wireless communications device by the one wireless communications device; and transmitting the transmission processing performance information by the other wireless communications device in response to the requesting.

A wireless communications device according to the second embodiment has an access point function of a wireless network, and includes: a transmission processing performance information storage configured to store therein a piece of transmission processing performance information; and a determination unit configured to determine, between the wireless communications device and another wireless communications device that form the wireless network, one of the wireless communications devices as an access point, wherein the determination unit includes: an acquisition unit configured to acquire the piece of transmission processing performance information of the another wireless communications device; and a determination unit configured to determine the access point on the basis of both of the pieces of transmission processing performance information of the wireless communications devices.

An electronic apparatus that includes the wireless communications device according to the second embodiment may be provided.

Third Embodiment

Figure 9:
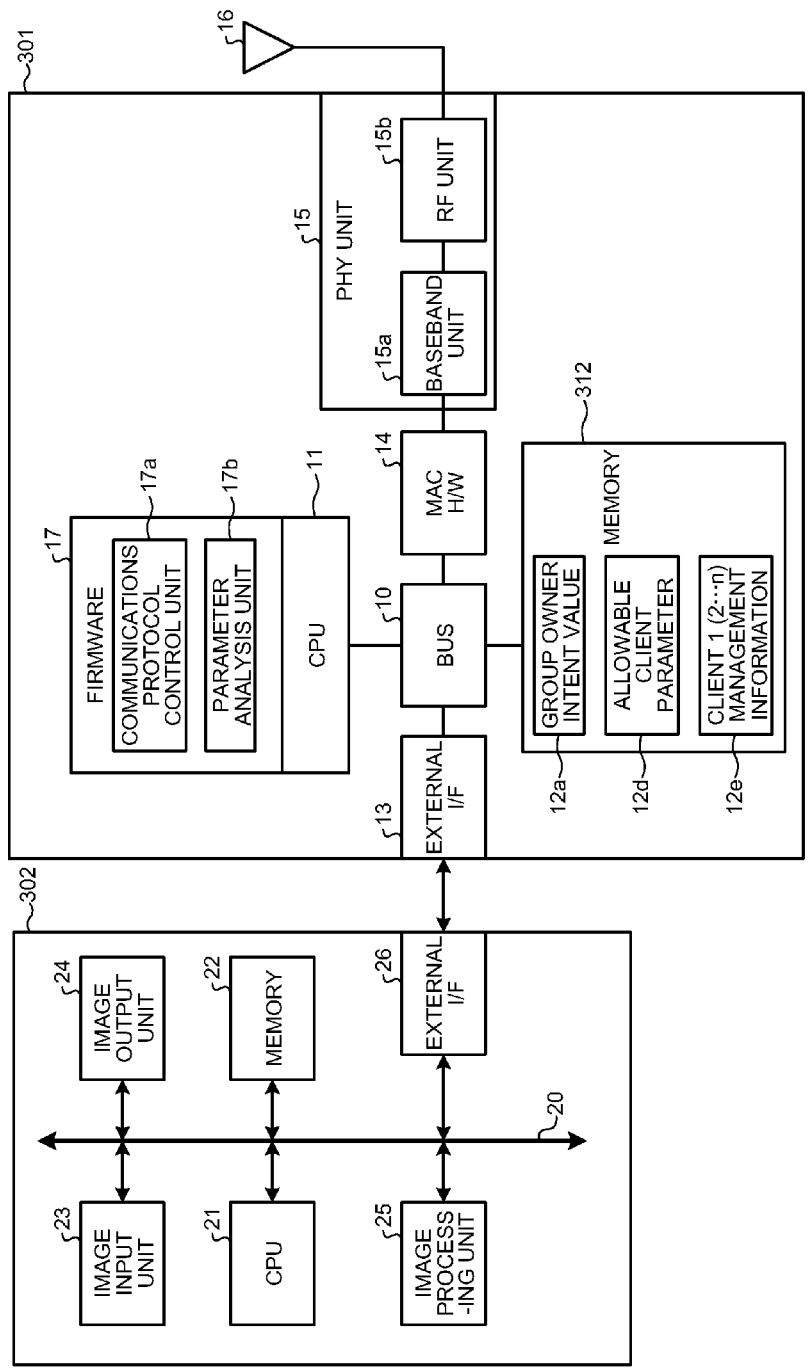
FIG. 9 is a block diagram of an electronic apparatus including a wireless communications device of a third embodiment.

Structure and General Operation of Electronic Apparatus Including Wireless Communications Device FIG. 9 is a block diagram of an electronic apparatus including a wireless communications device 301 of the third embodiment and an image processing device 302. The wireless communications device 301 is compliant with IEEE 802.11 standards. The structure illustrated in FIG. 9 differs from that in FIG. 1 in that a memory 312 includes an allowable client parameter 12d and client management information 12e. Except for that, the structure of FIG. 9 is the same as that of FIG. 1. Thus, the same elements are labeled with the same reference numerals and the description thereof is omitted.

Group Owner Negotiation

The firmware 17 includes computer programs and data necessary for performing the group owner negotiation compliant with Wi-Fi Direct in the same manner as conventional devices.

Figure 10:
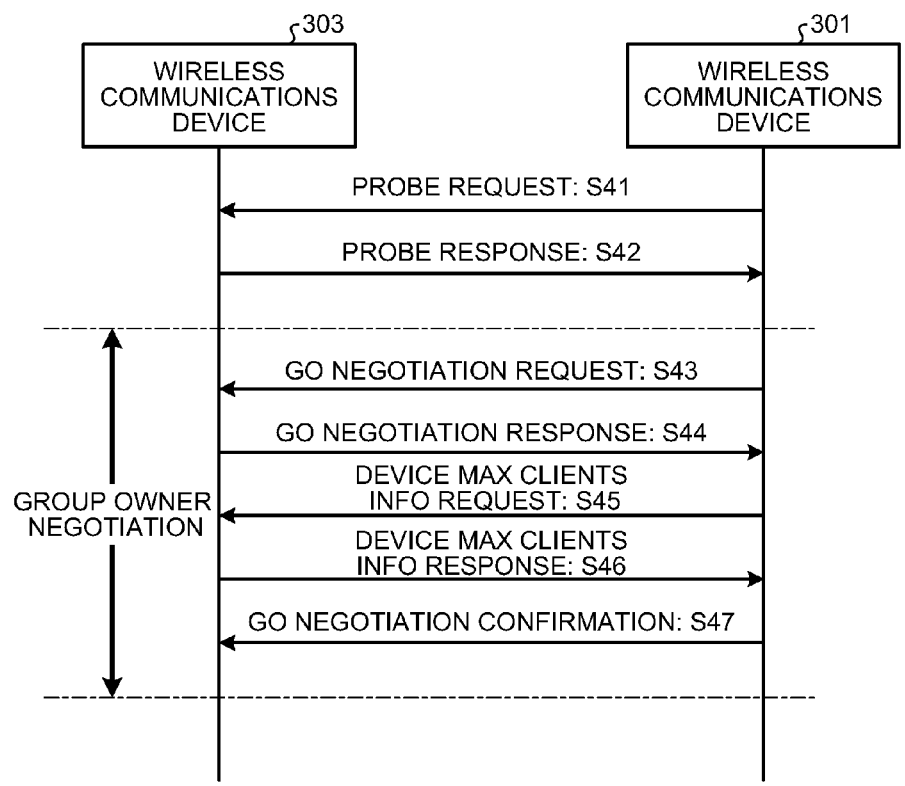
FIG. 10 is a sequence diagram illustrating the group owner negotiation of the wireless communications device of the third embodiment.

FIG. 10 is a sequence diagram illustrating a procedure to determine the P2P group owner between the wireless communications device 301 of the third embodiment and the wireless communications device 303 having the same structure as the wireless communications device 301. A case is described below in which the wireless communications device 301 starts the searching operation. The wireless communications device 301 preliminarily inputs various types of control information such as the group owner intent value 12a and the allowable client parameter 12d into the memory 312 through the external I/F 13, for example, and stores them therein. When the wireless communications device 301 is determined as the P2P group owner, the client management information 12e is written. The wireless communications device 303 also inputs and stores the various types of control information in the same manner as the wireless communications device 301.

The allowable client parameter 12d is the number of clients that the wireless communications device can manage when the wireless communications device is determined as the group owner. The number largely depends on an available memory amount secured inside the wireless communications device. The client management information 12e includes addresses allocated to clients when the clients are connected, information relating to transmission rates supported by the clients, presence or absence of security, and a power management method. These pieces of information are obtained after the connection is established between the wireless communications devices by exchanging information therebetween. The information is stored in a secured area in the memory 312 and managed for each client.

As illustrated in FIG. 10, first, the wireless communications device 301 transmits the probe request frame (sequence S41). Upon receiving the probe request frame, the wireless communications device 303 sends the probe response frame back (sequence S42). Upon receiving the probe response frame, the wireless communications device 301 recognizes the presence of another wireless communications device at a place at which communications can be made with the wireless communications device 301, transmits the GO negotiation request frame, and starts the group owner negotiation (sequence S43). Upon receiving the GO negotiation request frame, the wireless communications device 303 sends the GO negotiation response frame back (sequence S44).

Then, the wireless communications device 301 transmits a device maximum client number information request frame (sequence S45). This frame requests the wireless communications device 303 to transmit information indicating the number of maximum connectable clients, i.e., the allowable client parameter 12d and transmits the allowable client parameter 12d of the wireless communications device 301 to the wireless communications device 303. Upon receiving the device maximum client number information request frame, the wireless communications device 303 transmits a device maximum client number information response frame including the allowable client parameter 12d (sequence S46).

Figure 11:
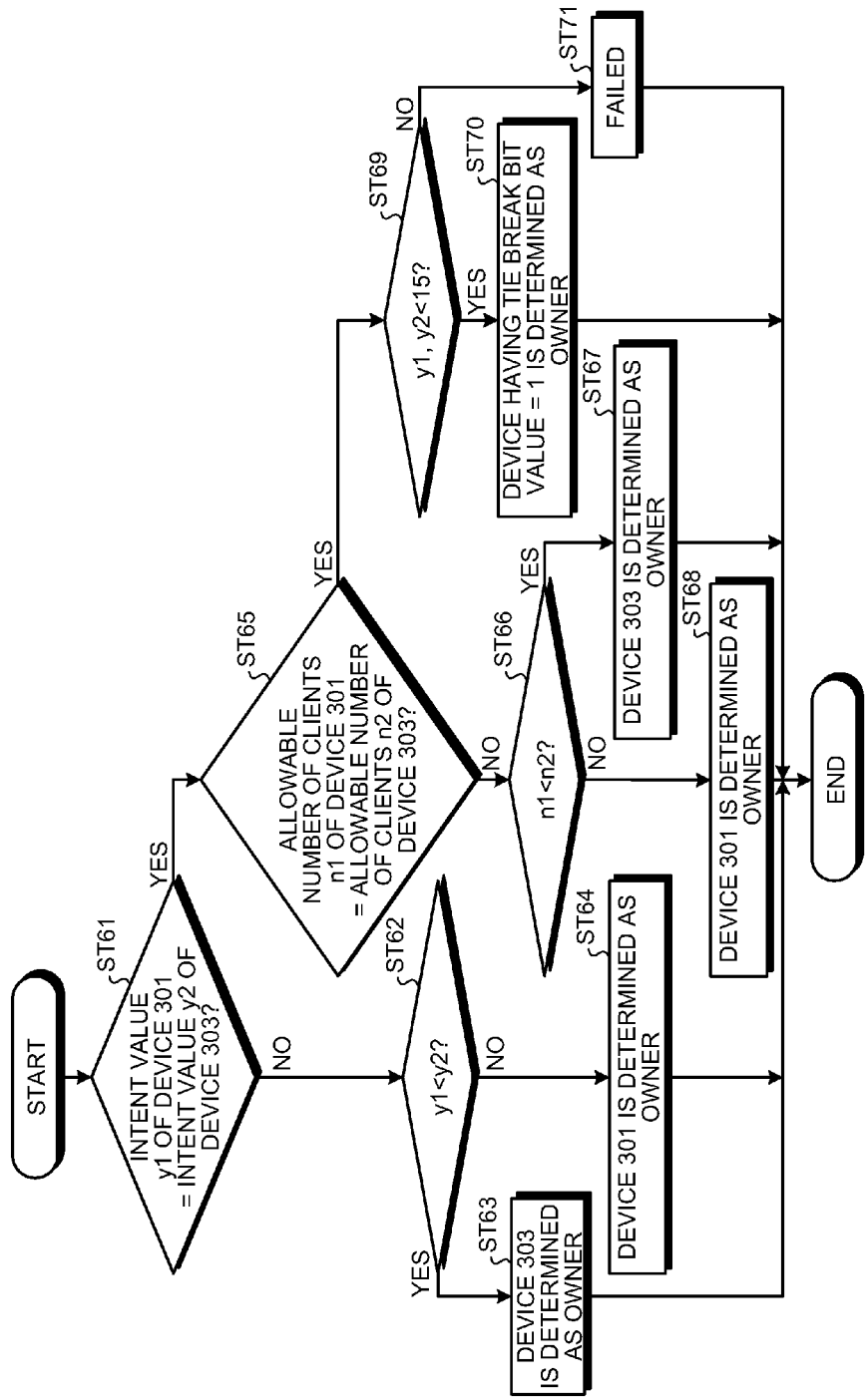
FIG. 11 is a flowchart illustrating a procedure to determine the group owner in the group owner negotiation illustrated in FIG. 10.
Figure 12:
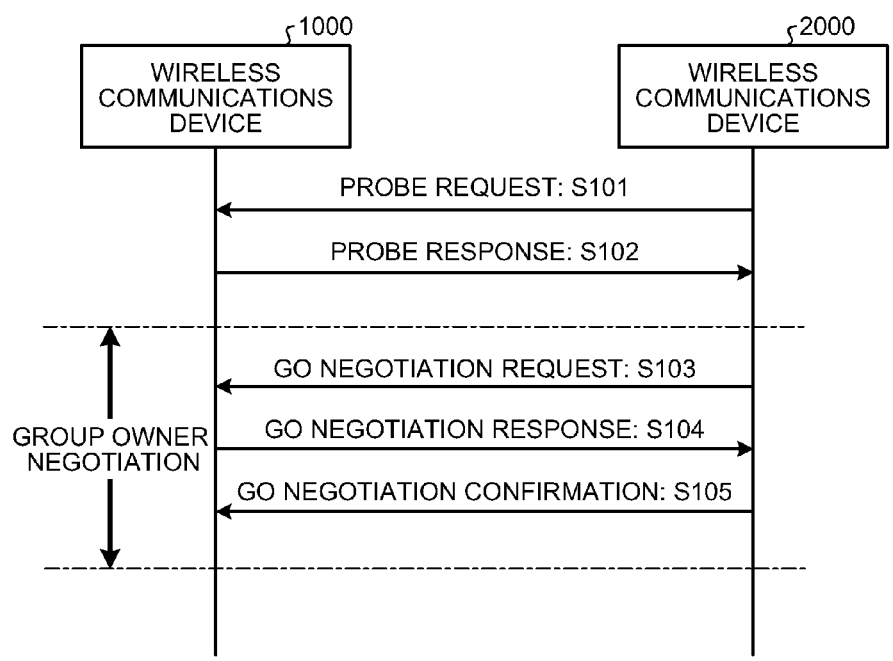
FIG. 12 is a sequence diagram illustrating the group owner negotiation between related art wireless communications devices.

Upon receiving the device maximum client number information response frame, the wireless communications device 301 determines the P2P group owner by the procedure of the flowchart illustrated in FIG. 11, and notifies the wireless communications device 303 of the result with the GO negotiation confirmation frame (sequence S47). The wireless communications device 303 also determines the P2P group owner by the procedure of the flowchart illustrated in FIG. 11. The operation of the wireless communications device 301 is described below.

As illustrated in FIG. 11, the wireless communications device 301 determines whether the group owner intent value y1 of the own device (the wireless communications device 301) is equal to the group owner intent value y2 of the wireless communications device 303 (step ST61). If it is determined that they are not equal (NO at step ST61), the wireless communications device 301 determines a magnitude relationship between y1 and y2 (step ST62) and determines the wireless communications device having a larger group owner intent value as the P2P group owner (steps ST62 to ST64). That is, if the group owner intent value y1 of the own device is larger (NO at step ST62), the wireless communications device 301 determines the own device as the P2P group owner (step ST64). If the group owner intent value y2 of the wireless communications device 303 is larger (YES at step ST62), the wireless communications device 301 determines the wireless communications device 303 as the P2P group owner (step ST63).

If the group owner intent values of the wireless communications devices 301 and 303 are equal to each other (YES at step ST61), the wireless communications device 301 determines whether the allowable client numbers, i.e., the numbers of maximum connectable clients, of both devices are equal to each other (step ST65). If it is determined that they are not equal to each other (NO at step ST65), the wireless communications device 301 determines the wireless communications device having a larger allowable client number as the P2P group owner (steps ST66 to ST68). That is, if an allowable client number n1 of the own device (the wireless communications device 301) is larger (NO at step ST66), the wireless communications device 301 determines the own device as the P2P group owner (step ST68). If an allowable client number n2 of the wireless communications device 303 is larger (YES at step ST66), the wireless communications device 301 determines the wireless communications device 303 as the P2P group owner (step ST67).

If the allowable client numbers of both devices are equal to each other (YES at step ST65), the wireless communications device 301 determines whether the group owner intent values of both devices are less than 15 (step ST69). If they are less than 15 (YES at ST69), the wireless communications device 301 determines the wireless communications device that has set a tie break bit value to 1 as the P2P group owner (step ST70) while if they are 15 (NO at step ST69), the wireless communications device 301 determines that the determination procedure of the P2P group owner has failed (step ST71).

The contents of steps ST61 to ST64 and steps ST69 to ST71 in FIG. 11 are the same as those of steps ST101 to ST104 and steps ST105 to ST107 in FIG. 13. That is, the processing of the flowchart of FIG. 11 is equivalent to the processing structured by adding steps ST65 to ST68 between YES at step ST101 and step ST105 of the processing illustrated in FIG. 13.

In this way, when determining the P2P group owner between the wireless communications devices 301 and 303, the wireless communications device 301 of the third embodiment compares the allowable client numbers of both devices if the group owner intent values of both devices are equal to each other and determines the device having the larger allowable client number as the P2P group owner. Accordingly, the device having the larger allowable client number can be determined as the P2P group owner even if the group owner intent values of both devices are equal to each other. As a result, possibility of limiting the number of clients attending the network due to the allowable client number shortage of the device determined as the P2P group owner can be reduced. In addition, the wireless communications devices 301 and 303 can determine the same wireless communications device as the P2P group owner.

If the wireless communications devices 301 and 303 operate normally, the P2P group owner determined by each of the wireless communications devices 301 and 303 will be the same. Therefore, if the P2P group owner determined by the wireless communications device 303 is not the same as the P2P group owner notified from the wireless communications device 301 with the GO negotiation confirmation frame, the wireless communications device 303 can adopt the P2P group owner notified from the wireless communications device 301 or transmit an error notification to the wireless communications device 301.

In the procedure illustrated in FIG. 10, the allowable client parameter 12d is exchanged by transmitting the device maximum client number information request frame and the device maximum client number information response frame. The transmission of the device maximum client number information request frame and the device maximum client number information response frame can be omitted as follows: the allowable client parameter of the wireless communications device 301 is included in the GO negotiation request frame while the allowable client parameter of the wireless communications device 303 is included in the GO negotiation response frame, and the allowable client parameter is exchanged by transmitting the GO negotiation request frame and the GO negotiation response frame.

When another wireless communications device newly moves to a position at which communications can be made between the wireless communications devices forming the P2P group and the wireless communications device intends to serve as the P2P group owner after the P2P group owner has determined by the procedure illustrated in FIG. 10, the group owner negotiation is performed between the new communications device and the P2P group owner, and the P2P group owner is newly decided.

According to the third embodiment, in a network group including a plurality of wireless communications devices and the ad-hoc network communications, in which one of the wireless communications devices in the network group is selected and plays like an access point role in the infrastructure communications as the P2P group owner, the P2P group owner is determined as follows: the wireless communications devices, each of which has the group owner intent value that indicates a level of intention to serve as the owner and the allowable client parameter 12d that indicates the number of allowable clients, exchange the group owner intent value and the allowable client parameter each other, compare the exchanged the allowable client parameters 12d with each other if the exchanged group owner intent values are equal to each other, and determine the wireless communications device having the larger allowable client number as the P2P group owner. Accordingly, the wireless communications device having the larger allowable client number can be determined as the P2P group owner even if the exchanged group owner intent values are equal to each other. As a result, the possibility of limiting the number of clients attending the network due to the allowable client number shortage of the device determined as the P2P group owner can be reduced because the wireless communications device that can connect the largest number of clients is determined as the P2P group owner among the wireless communications devices forming the network group.

In the third embodiment, the P2P group owner is determined on the basis of the difference between the allowable client numbers if the group owner intent values of the wireless communications devices 1 and 3 are equal to each other after exchanging of the group owner intent values between both devices in the group owner negotiation. The P2P group owner, however, may be determined by only exchanging and comparing the allowable client parameters 12d without exchanging and comparing the group owner intent values. In this case, the P2P group owner can be determined simply on the basis of the difference between the allowable client numbers without being influenced by the group owner intent values. As a result, the possibility of limiting the number of clients attending the network due to the allowable client number shortage of the device determined as the P2P group owner can be further reduced.

A method according to third embodiment is for determining an access point among a plurality of wireless communications devices each having an access point function of a wireless network, the method including: exchanging pieces of allowable client number information between two wireless communications devices that form the wireless network, each wireless communications device storing the piece of allowable client number information; and determining, by each wireless communications device, the access point on the basis of both of the pieces of allowable client number information of the wireless communications devices.

The method according to the third embodiment may further include exchanging intent values that each indicate a level of intention to serve as the access point specified on the basis of a certain criterion between the two wireless communications devices, the intent values being stored in the wireless communications devices, respectively, wherein the determining may include determining the access point the basis of both of the intent values and both of the pieces of the allowable client number information of the wireless communications devices.

In the method according to the third embodiment, the exchanging the pieces of transmission processing performance information and the exchanging the intent values may be simultaneously performed.

In the method according to the third embodiment, the exchanging the pieces of transmission processing performance information and the exchanging the intent values may be sequentially performed.

In the method according to the third embodiment, the determining may include: determining a magnitude relationship between the both of the intent values; determining the wireless communications device having a larger intent value as the access point when it is determined that the intent values are not equal to each other; and determining the wireless communications device having a larger allowable client number as the access point when it is determined that the intent values are equal to each other.

In the method according to the third embodiment, the exchanging the allowable client number information may include: requesting the allowable client number information by one of the two wireless communications devices to the other wireless communications device and notifying the other wireless communications device of the allowable client number information of the one wireless communications device by the one wireless communications device; and transmitting the allowable client number information by the other wireless communications device in response to the requesting.

A wireless communications device according to the third embodiment has an access point function of a wireless network, and includes: an allowable client number information storage configured to store therein a piece of allowable client number information; and a determination unit configured to determine, between the wireless communications device and another wireless communications device that form the wireless network, one of the wireless communications devices as an access point, wherein the determination unit includes: an acquisition unit configured to acquire the piece of allowable client number information of the another wireless communications device; and a determination unit configured to determine the access point on the basis of both of the pieces of allowable client number information of the wireless communications devices.

An electronic apparatus that includes the wireless communications device according to the third embodiment may be provided.

According to the embodiments, it is possible to reduce the possibility of disconnecting the wireless network due to the power shortage to drive the wireless communications device serving as the access point in the wireless network including a plurality of wireless communications devices each having the access point function of the wireless network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for determining an access point among a plurality of wireless communications devices each having an access point function in a wireless network, the method comprising:
(a) exchanging intent values and pieces of power supply status information between two wireless communications devices that form the wireless network, each wireless communications device storing the intent value indicating a level of intention to serve as the access point specified on the basis of a certain criterion and the piece of power supply status information indicating whether power is supplied to the each wireless communications device from an alternating-current (AC) power supply; and
(b) determining, by each wireless communications device, the access point on the basis of both of the intent values and both of the pieces of power supply status information of the wireless communications devices,
wherein said determining in (b) includes performing, by each wireless communications device, each of the following (b1), (b2) and (b3):
(b1) determining a magnitude relationship between both of the intent values;
(b2) determining the wireless communications device having a larger intent value as the access point, in a case that it is determined in (b1) that the intent values are not equal to each other; and
(b3) determining the wireless communications device the power of which is supplied from the AC power supply as the access point, in a case that it is determined in (b1) that the intent values are equal to each other
wherein the exchanging in (a) includes performing each of the following (a1) and (a2)
(a1) by one of the wireless communications devices, requesting the intent value and the piece of power supply status information, from the other wireless communications device, and notifying the other wireless communications device of the intent value and the piece of power supply status information of the one wireless communications device; and
(a2) by the other wireless communications device, transmitting the intent value and the piece of power supply status information in response to the request of the one wireless communications device;
wherein the method further comprises:
(c) increasing the intent value of the one wireless communications device when the power is supplied from the AC power supply to the one wireless communications device before the one wireless communications device starts the requesting in (a1);
(d) increasing the intent value of the other wireless communications device when the power is supplied from the AC power supply to the other wireless communications device before the other wireless communications device starts the transmitting in (a2);
(e) decreasing the intent value of the one wireless communications device when the power is not supplied from the AC power supply to the one wireless communications device before the one wireless communications device starts the requesting in (a1); and
(f) decreasing the intent value of the other wireless communications device when the power is not supplied from the AC power supply to the other wireless communications device before the other wireless communications device starts the transmitting in (a2).

2. The method according to claim 1, wherein the one of the wireless communications devices acquires the intent value and the piece of power supply status information simultaneously from the other wireless communications device.

3. The method according to claim 1, wherein the one of the wireless communications devices acquires the intent value and the piece of power supply status information serially from the other wireless communications device.

4. The method according to claim 1, wherein
each wireless communications device includes a battery, and
the power supply status information indicates whether the power is supplied from the AC power supply or the corresponding wireless communications device is driven by the battery.

5. A method for updating the access point determined by the method according to claim 1, the method for updating the access point, comprising:
by one of the wireless communications devices serving as the access point, notifying the other wireless communications device of change information indicating that the one wireless communications device is switched from a status of being supplied from the AC power supply power to a status of being not supplied from the AC power supply power;
exchanging, between the one wireless communications device serving as the access point and the other wireless communications device having received the notification, the intent values and the pieces of power supply status information which are stored in each wireless communications device; and
each of the one wireless communications device serving as the access point and the wireless communications device having received the notification, determining the access point on the basis of both of the intent values and both of the pieces of power supply status information of the wireless communications devices.

6. A wireless communications device comprising:
an intent value storage configured to store therein an intent value indicating a level of intention to serve as an access point specified on the basis of a certain criterion;
a power supply status information storage configured to store therein a piece of power supply status information indicating whether power is supplied to the wireless communications device from an alternating-current (AC) power supply; and
an access point determination unit configured to determine, between the wireless communications device and another wireless communications device forming the wireless network, one of the wireless communications devices as the access point,
wherein the access point determination unit includes
an acquisition unit configured to acquire the intent value and the piece of power supply status information of the another wireless communications device, and
a determination unit configured to determine the access point on the basis of both of the intent values and both of the pieces of power supply status information of the wireless communications devices, and
wherein the acquisition unit is configured to perform each of the following (a1) (a2) and (a3):
(a1) request the intent value and the piece of power supply status information from said another wireless communications device;

(a2) receive the intent value and the piece of power supply status information from said another wireless communications device in response to the request, and
(a3) notify said another wireless communications device of the intent value and the piece of power supply status information of the one wireless communications device,
wherein the determination unit of the access point determination unit is configured to perform each of the following (b1), (b2) and (b3):
(b1) determine a magnitude relationship between both of the intent values;
(b2) determine the wireless communications device having a larger intent value as the access point, in a case that the determination unit determines in (b1) that the intent values are not equal to each other;
(b3) determine the wireless communications device the power of which is supplied from the AC power supply as the access point, in a case that the determination unit determines in (b1) that the intent values are equal to each other;
(c) increase the intent value of the wireless communications device when the power is supplied from the AC power supply to the wireless communications device before the wireless communications device starts the requesting in (a1); and
(d) increase the intent value of said another wireless communications device when the power is supplied from an AC power su ply to said another wireless communications device before said another wireless communications device starts transmitting the information received in (a2);
(e) decrease the intent value of the wireless communications device when the power is not supplied from the AC power supply to the wireless communications device before the wireless communications device starts the requesting in (a1); and
(f) decrease the intent value of said another wireless communications device when the power is not supplied from the AC power supply to said another wireless communications device before said another wireless communications device starts transmitting the information received in (a2).

7. An electronic apparatus, comprising the wireless communications device according to claim 6.

* * * * *